US007440953B2

(12) United States Patent
Sidman

(10) Patent No.: US 7,440,953 B2
(45) Date of Patent: Oct. 21, 2008

(54) APPARATUS, METHOD AND SYSTEM FOR DIRECTORY QUALITY ASSURANCE

(75) Inventor: David Sidman, Brooklyn, NY (US)

(73) Assignee: Content Directions, Inc., New York, NY (US)

( * ) Notice: Subject to any disclaimer, the term of this patent is extended or adjusted under 35 U.S.C. 154(b) by 494 days.

(21) Appl. No.: 10/470,207

(22) PCT Filed: Jan. 25, 2002

(86) PCT No.: PCT/US02/02321

§ 371 (c)(1),
(2), (4) Date: Feb. 11, 2004

(87) PCT Pub. No.: WO02/059797

PCT Pub. Date: Aug. 1, 2002

(65) Prior Publication Data

US 2004/0122863 A1 Jun. 24, 2004

Related U.S. Application Data

(60) Provisional application No. 60/328,275, filed on Oct. 9, 2001, provisional application No. 60/328,274, filed on Oct. 9, 2001, provisional application No. 60/328,270, filed on Oct. 9, 2001, provisional application No. 60/303,768, filed on Jul. 10, 2001, provisional application No. 60/279,792, filed on Mar. 29, 2001, provisional application No. 60/276,459, filed on Mar. 16, 2001, provisional application No. 60/270,473, filed on Feb. 21, 2001, provisional application No. 60/268,766, filed on Feb. 14, 2001, provisional application No. 60/267,899, filed on Feb. 9, 2001, provisional application No. 60/267,875, filed on Feb. 8, 2001, provisional application No. 60/264,333, filed on Jan. 25, 2001.

(51) Int. Cl.
*G06F 17/30* (2006.01)
(52) U.S. Cl. ...................................................... 707/100
(58) Field of Classification Search .................... 707/2, 707/10, 100; 709/217, 224; 713/200; 714/749
See application file for complete search history.

(56) References Cited

U.S. PATENT DOCUMENTS 5,721,943 A * 2/1998 Johnson ....................... 713/300
5,918,214 A 6/1999 Perkowski (Continued)

FOREIGN PATENT DOCUMENTS

EP 0 715 244 A1 6/1996
WO WO 97/43717 11/1997

OTHER PUBLICATIONS

"A Reference Model For Metadata", Bretherton et al., University of Wisconsin, Mar. 1994, pp. 1-18.

(Continued)

*Primary Examiner*—Etienne P LeRoux
(74) *Attorney, Agent, or Firm*—Chadbourne & Parke, LLP; Walter G. Hanchuk

(57) ABSTRACT

An apparatus, method and system to validate the integrity of a persistent identifier of information that may be located in multiple locations, formats, and accessible in variable fashions based on the context of use (135). The present disclosure further provides the ability to validate that the information being identified is valid for any given identifier. The present disclosure also teaches the ability to automatically generate tags that allows for the validation of both information and associated information identifiers either through validation and/or through registration. The invention teaches how to test and assure the quality of association between an identifier of information and the actual information. The invention details how to automatically correct poor quality references being used by identifiers, and/or provides notification escalation to aid in maintaining persistent identifier and information association (135).

8 Claims, 20 Drawing Sheets

U.S. PATENT DOCUMENTS

| | | | |
|---|---|---|---|
| 5,950,173 | A | 9/1999 | Perkowski |
| 6,135,646 | A | 10/2000 | Kahn et al. |
| 6,151,624 | A | 11/2000 | Teare et al. |
| 6,154,738 | A | 11/2000 | Call |
| 6,412,071 | B1 * | 6/2002 | Hollander et al. ............. 726/23 |
| 6,694,471 | B1 * | 2/2004 | Sharp ......................... 714/749 |
| 6,748,448 | B1 * | 6/2004 | Barrera et al. ............. 709/245 |
| 6,760,767 | B1 * | 7/2004 | Miesbauer et al. .......... 709/227 |
| 6,959,326 | B1 * | 10/2005 | Day et al. ................... 709/217 |

OTHER PUBLICATIONS

Arms, W.Y. et al., "An Architecture for Information in Digital Libraries", D-Lib Magazine, Feb. 1997, pp. 1-12.

Hoffman, P. et al., "URN Resolution Overview", Oct. 21, 1995, pp. 1-4.

"In Search Of The Unicorn: The Digital Object Identifier from a User Perspective", BNBRF Report, No. 89, Feb. 1998, pp. 1-36.

Kahle, B., "Preserving The Internet", Scientific American, Mar. 1, 1997, pp. 72-73.

Kahn, R. et al., "A Framework For Distributed Digital Object Services", Kahn/Wilensky Architecture, May 13, 1995, pp. 1-13.

Mojo Nation Docs: "Technology Overview", Mojo Nation, Feb. 14, 2000, pp. 1-5.

Payette, S. et al., "Interoperability for Digital Objects and Repositories", D-Lib Magazine, vol. 5, No. 5, May 1999, pp. 1-17.

Paskin, M., "Digital Object Identifier: implementing a standard digital identifier as the key to effective digital rights management", The International DOI Foundation, Apr. 2000, pp. 1-20.

Simonson, J. et al., "Content Permanence Via Versioning and Fingerprinting", Proceedings Of The ACM Conference on Hypertext, May 30, 2000, pp. 226-227.

Simonson, J. et al., "Version augmented URIs for reference permanencevia an Apache module design", Computer Networks and ISDN Systems, vol. 30, No. 1-7, Apr. 1998, pp. 337-345.

"The DOI Handbook Chapter 6: Resolution", from www.doi.org/handbook_2000; Nov. 17, 2000, pp. 1-4.

Tilley, S. et al., "Spreading Knowledge About Gnutella: A Case Study in Understanding Net-Centric Applications", IEEE, May 12, 2001, pp. 189-198.

Supplementary European Search Report for EP 02713463 dated Feb. 4, 2005, 2 pages.

Supplementary European Search Report for EP 02718881 dated Feb. 4, 2005, 2 pages.

Supplementary European Search Report for EP 02718882 dated Feb. 4, 2005, 2 pages.

Supplementary European Search Report for EP 02706002 dated Feb. 22, 2005, 2 pages.

"Managing Intellectual Property Resources Using the DOI System", XML Europe 2001, Eamonn Neylon, Internationales Congress Centrum (ICC), May 2001.

"Pre-Scoping Proposal", http//library.caltech.edu/openurl/record_documents/PreScoping_Jan_3rd.htm, Jan. 3, 2002.

"Scoping Agreements I",http://library.caltech.edu/openurl/record_documents/Scoping_Jan8th.htm, Jan. 8, 2002.

"SFX", Ex Libris, http://www.exlibrisgroup.com/sfx.htm, 2005.

"First Steps in an Information Commerce Economy, Digital Rights Management in the Emerging EBook Environment", Eamonn Neylon, D-Lib Magazine, Jan. 2001, v. 7 No. 1.

"Intellectual Property in a Fragmented World", Eamonn Neylon, May 1998, http://www.infoloom.com/gcaconfs/WEB/paris98/neylon.htm.

"[handle-dev] New Handle Client-SDX", http://132.151.9.20/mail-archive/handle-dev/msg00036.html, May 17, 2001.

"Servlet DOI eXtension" download code from http://www.manifestsolutions.com/download.html, resolver.zip, Apr. 26, 2001 (Entire posted package); ReadME.txt, Apr. 26, 2001; radextraParse.java, Apr. 26, 2001; radresolver.java; Feb. 22, 2001; admin.gif, Feb. 22, 2001; thedemon.html, Feb. 22, 2001; message.txt, Jan. 11, 2001; arrow.gif, Dec. 6, 2000; handle.jar, Nov. 28, 2000; Jakarta-oro-2.0.1.jar, Nov. 23, 2000.

"Acknowledgements", http://1060research-server-1.co.uk/docs/1.0.0/docxter/doc_docs_acknowledgements.html, (2003-2004).

"NetKernel History", http://1060research-server-1.co.uk/docs/1.0.0/docxter/doc_intro_history.html, 2003-2004.

"The doi URI Scheme for Digital Object Identifier (DOI)", http://mirrors.isc.org/pub/www.watersprings.org/pub/id/draft-paskin-doi-uri-01.txt, Sep. 2002.

"Meeting Report of the NISO Linking Workshop", Mark Needleman, National Information Standards Organization, Feb. 11, 1999.

"First Workshop on Linkage From Citations to Electronic Journal Literature", National Information Standards Organization, Feb. 11, 1999.

"Second Workshop on Linkage From Citations to Electronic Jourrnal Literature", National Information Standards Organization, Jun. 9, 1999.

"The DOI Metadata Initiative an Overview", David Sidman, May 11, 1998.

"A Progress Report From Workshop on the DOI Held in May 1998", The International DOI Foundation, Norman Paskin.

"The Digital Object Identifier System" Luxembourg DOI workshop DGXIII/DOI Foundation May 20, 1998, 63 sheets of slides.

\* cited by examiner

APPARATUS, METHOD AND SYSTEM FOR DIRECTORY QUALITY ASSURANCE

RELATED APPLICATIONS

The instant application hereby claims priority to the following U.S. provisional patent applications: (1) Ser. No. 60/264,333 for "Reference Linking with DOIs" filed on Jan. 25, 2001; (2) Ser. No. 60/268,766 for "Apparatus, Method, and System for Multiple Resolution Affecting Information Access" filed on Feb. 14, 2001; (3) Ser. No. 60/276,459 for "Apparatus, Method, and System for Registration Effecting Information Access" filed on Mar. 16, 2001; (4) Ser. No. 60/279,792 for "Apparatus, Method and System For Directory Quality Assurance" filed on Mar. 29, 2001; (5), Ser. No. 60/303,768 for "Apparatus, Method, and System for Accessing Digital Rights Management Information" filed on Jul. 10, 2001; (6) Ser. No. 60/328,275 for "Apparatus, Method and System For Accessing Digital Rights Management Information" filed on Oct. 9, 2001; (7) Ser. No. 60/267,875 for "Apparatus, Method, and System for Accessing Information" filed on Feb. 8, 2001; (8) Ser. No. 60/267,899 for "Provisional filing for Apparatus, Method, and System for Accessing Information" filed on Feb. 9, 2001; (9) Ser. No. 60/270,473 for "Business Value and Implementation Considerations For The DOI" filed on Feb. 21, 2001; (10) Ser. No. 60/328,274 for "Apparatus, Method And System For Effecting Information Access In A Peer Environment" filed on Oct. 9, 2001; (11) Ser. No. 60/328,270 for "Apparatus, Method and System For Tracking Information Access" filed on Oct. 9, 2001; each of these applications being herein incorporated by reference.

The instant application, also, hereby incorporates by reference the following Patent Cooperation Treaty applications: (12) for an "Apparatus, Method and System For Multiple Resolution Affecting Information Access" PCT/US02/02474, which was filed on Jan. 25, 2002 in the name of David Sidman; (13) for an "Apparatus, Method and System For Registration Effecting Information Access" PCT/US02/02175, which was filed on Jan. 25, 2002 in the name of David Sidman; (14) "Apparatus, Method and System For Accessing Digital Rights Management Information" PCT/US02/02322, which was filed on Jan. 25, 2002 in the name of David Sidman; (15) for an "Apparatus, Method and System For Effecting Information Access in a Peer Environment," PCT/US02/02475, which was filed on Jan. 25, 2002 in the name of David Sidman; and (16) for an "Apparatus, Method and System For Tracking Information Access," PCT/US02/02476, which was filed on Jan. 25, 2002 in the name of David Sidman.

FIELD

The present invention relates generally to an apparatus, method and system to validate the access of information across a communications network. More particularly, the disclosed invention relates to an apparatus, method and system to verify the ability to access and resolve persistent identifiers with their associated information in various contexts of use on a communications network.

BACKGROUND

Internet

As Internet usage increases, the amount of information available on the Internet also increases. The information that exists on the Internet is of many different types, including documents in many formats such as: computer software, databases, discussion lists, electronic journals, library catalogues, online information services, mailing lists, news groups, streaming media, and the like. Fortunately, much of the information on the Internet can be accessed through the World-Wide Web using a web browser to interact with the network in a user-friendly way.

Networks

Networks are commonly thought to consist of the interconnection and interoperation of clients, servers, and intermediary nodes in a graph topology. It should be noted that the term "server" as used herein refers generally to a computer, other device, software, or combination thereof that processes and responds to the requests of remote users across a communications network. Servers serve their information to requesting "clients." A computer, other device, software, or combination thereof that facilitates, processes information and requests, and/or furthers the passage of information from a source user to a destination user is commonly referred to as a "node." Networks are generally thought to facilitate the transfer of information from source points to destinations.

Transmission Control Protocol-Internet Protocol (TCP/IP)

The proliferation and expansion of computer systems, databases, and networks of computers has been facilitated by an interconnection of such systems and networks in an extra-territorial communications network commonly referred to as the Internet. The Internet has developed and largely employs the Transmission Control Protocol-Internet Protocol (TCP/IP). _TCP/IP was developed by a Department of Defense (DoD) research project to interconnect networks made by various and varying network vendors as a foundation for a network of networks; i.e., the Internet. The development of TCP/IP was in part driven by a requirement by the DoD to have a network that will continue to operate even if damaged during battle, thus allowing for information to be routed around damaged portions of the communications network to destination addresses. Of course, if the source or destination address location itself is rendered inoperable, such delivery will not be possible.

The Internet is a packet-switched network and thus, information on the Internet is broken up into pieces, called packets, and transmitted in packet form. The packets contain IP addressing information called headers, which are used by routers to facilitate the delivery of the packets from a source to a destination across intermediary nodes on the Internet. Upon arrival at the destination, the packets are reassembled to form the original message, and any missing packets are requested again.

The IP component of the protocol is responsible for routing packets of information based on a four byte addressing mechanism; the address is written as four numbers separated by dots, each number ranging from 0 to 255, e.g., "123.255.0.123". IP addresses are assigned by Internet authorities and registration agencies, and are unique.

The TCP portion of the protocol is used for verifying that packets of information are correctly received by the destination computer from the source, and if not, to retransmit corrupt packets. Other transmission control protocols are also commonly used that do not guarantee delivery, such as User Datagram Protocol (UDP).

World Wide Web

The proliferation and expansion of the Internet, and particularly the World Wide Web (the web), have resulted in a vast and diverse collection of information. Various user interfaces that facilitate the interaction of users with information technology systems (i.e., people using computers) are currently in use. An information navigation interface called WorldWideWeb.app (the web) was developed in late 1990. Subsequently, information navigation interfaces such as web browsers have become widely available on almost every computer operating system platform.

Generally, the web is the manifestation and result of a synergetic interoperation between user interfaces (e.g., web browsers), servers, distributed information, protocols, and specifications. Web browsers were designed to facilitate navigation and access to information, while information servers were designed to facilitate provision of information. Typically, web browsers and information servers are disposed in communication with one another through a communications network. Information Servers function to serve information to users that typically access the information by way of web browsers. As such, information servers typically provide information to users employing web browsers for navigating and accessing information on the web. Microsoft's Internet Explorer and Netscape Navigator are examples' of web browsers. In addition, navigation user interface devices such as WebTV have also been implemented to facilitate web navigation. Microsoft's Information Server and Apache are examples of information servers.

Universal Resource Locator (URL)

The expansion of the web has resulted in an enormous quantity of information, which is accessible through the use of Universal Resource Locators (URLs). An URL is an address that is typically embodied as a hyperlink in a web page or is typed into a web browser. URLs for a given resource (most commonly a file located on a remote computer) refer only to a location for that resource. Typically, the reference to the location is achieved through the use of an unresolved IP address in conjunction with a directory path and file name; e.g., "http://www.aWebSite.com/aFolder/aFile.html". In this example, the URL directs the browser to connect to the computer named "www" in the domain "aWebSite.com," and to request the file named "aFile.html" stored in directory "aFolder" at that computer.

Universal Name Identifier (UNI)

The Corporation for National Research Initiatives has created and implemented a new means of naming and locating information, called the Handle System. The Handle System is designed to improve upon the current use of URLs.

The Handle System introduces a level of indirection to locating and distributing information over the Internet. The Handle System is a general-purpose system for naming resources. Instead of being assigned a URL based on a particular resource's current network location, a resource may be assigned a Universal Name Identifier. A UNI is a form of Universal Resource Identifier (URI). URIs include both UNIs and URLs. A UNI, unlike a URL, serves and shall be regarded henceforth as a name for the resource that is persistent regardless of changes in the resource's location or other attributes. In turn, a Universal Resource Name (URN) is a type of UNI (i.e., a UNI subsumes the concept of a URN). Furthermore, a Handle is a type of URN. And a Digital Object Identifier (DOI) is a type of Handle. Thus, various forms of UNIs include Handles, URNs, DOIs, and/or the like. The various terms and/or forms of UNIs will be used interchangeably throughout this document, and may be assumed to be interchangeable unless stated otherwise. A Handle is a unique name, which is registered with the Handle System along with the current network location of the named resource. This location information commonly takes the form of a URL. One common type of Handle is known as a Digital Object Identifier (DOI). Handles may be then distributed to users in lieu of a URL, and superficially appear to function similarly to a hyperlink. When a user encounters a Handle, the user may select or enter the Handle much like a URL hyperlink, so long as the user's web browser is capable of making Handle requests. Such an encounter triggers an automated process to look up a resource's current location. The current location of the resource is associated with the resource's Handle in a directory made available by the Handle System, which in turn directs the user to the resource's current location. Unlike with a URL, if the resource moves, the Handle System directory entry can be updated, thereby assuring a persistent association between a Handle and the resource it identifies. An analogy can be made to the physical world: knowing only a URL for a given resource is akin to knowing only a person's street address, and not her name. If she were to move across town, it would be very difficult to locate her without knowing her name. The Handle System allows resources to be permanently named by way of a Handle, and it allows the current network location of resources to be looked up based on that name in a Handle System directory.

SUMMARY

Digital Object Identifiers overcome many of the shortcomings of IP- and other location-based addressing schemes. DOIs enable access to information over a communications network by providing a persistent identifier for information that may be regularly relocated. DOIs overcome the limitations of network addressing schemes limited to addressing locations by providing a mechanism to associate identifiers with information through an added level of indirection instead of associating identifiers with locations Although DOIs provide a mechanism that allows for the association of an identifier with information instead of a location, DOIs in and of themselves do not provide for the access of multiple and/or varying instances of a piece of information in various locations, formats, or the access of various services associated with a given piece of information, based on various contexts of use. Furthermore, until the present invention, there was no mechanism to validate that such identifiers, e.g., DOIs, would properly resolve a request to an appropriate piece of associated information.

In one embodiment, the disclosure teaches a method of using a computer for validation, comprising: obtaining a unique, persistent, and universal name identifier for a source, obtaining location addresses of the source for resolution with the unique, persistent, and universal name identifier, and validating that the location addresses are accessible.

In another embodiment, the disclosure teaches a method of using a computer for validation, comprising: determining a tagging code, wherein the tagging code, once recognized, establishes the validity of a source, and tagging a source with the tagging code, wherein the source is resolved to by a unique, persistent, and universal name identifier.

In another embodiment, the disclosure teaches a method of using a computer to access information, comprising: determining a tagging code, wherein the tagging code, once recognized, establishes the validity of a source; tagging a source with the tagging code; generating a unique, persistent, and universal name identifier associated with the source; receiving an address for a location for the source; and effecting the registration of the unique, persistent, and universal name identifier with the address associated to the location of the source in a database for resolving unique, persistent, and universal name identifiers and locations of associated sources, wherein the unique, persistent, and universal name identifier is unique in the database.

In another embodiment, the disclosure teaches a method of using a computer to access information, comprising: determining a tagging code, wherein the tagging code, once recognized, establishes the validity of a source; tagging a source with the tagging code; allocating space in a storage facility for the source; making a location of the allocated space addressable and accessible over a communications network; storing the source to the allocated space; generating a unique, persistent, and universal name identifier associated with the source; and effecting the registration of the unique, persistent, and universal name identifier with an address associated to the location where the source is stored in a database for resolving unique, persistent, and universal name identifiers and locations of associated sources, wherein the unique, persistent, and universal name identifier is unique in the database The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The accompanying drawings illustrate certain embodiments of the disclosure.

FIG. 25 illustrates a non-limiting example of a policy manager tool.

DETAILED DESCRIPTION

Directory Quality Assurance Server Controller

Figure 1:
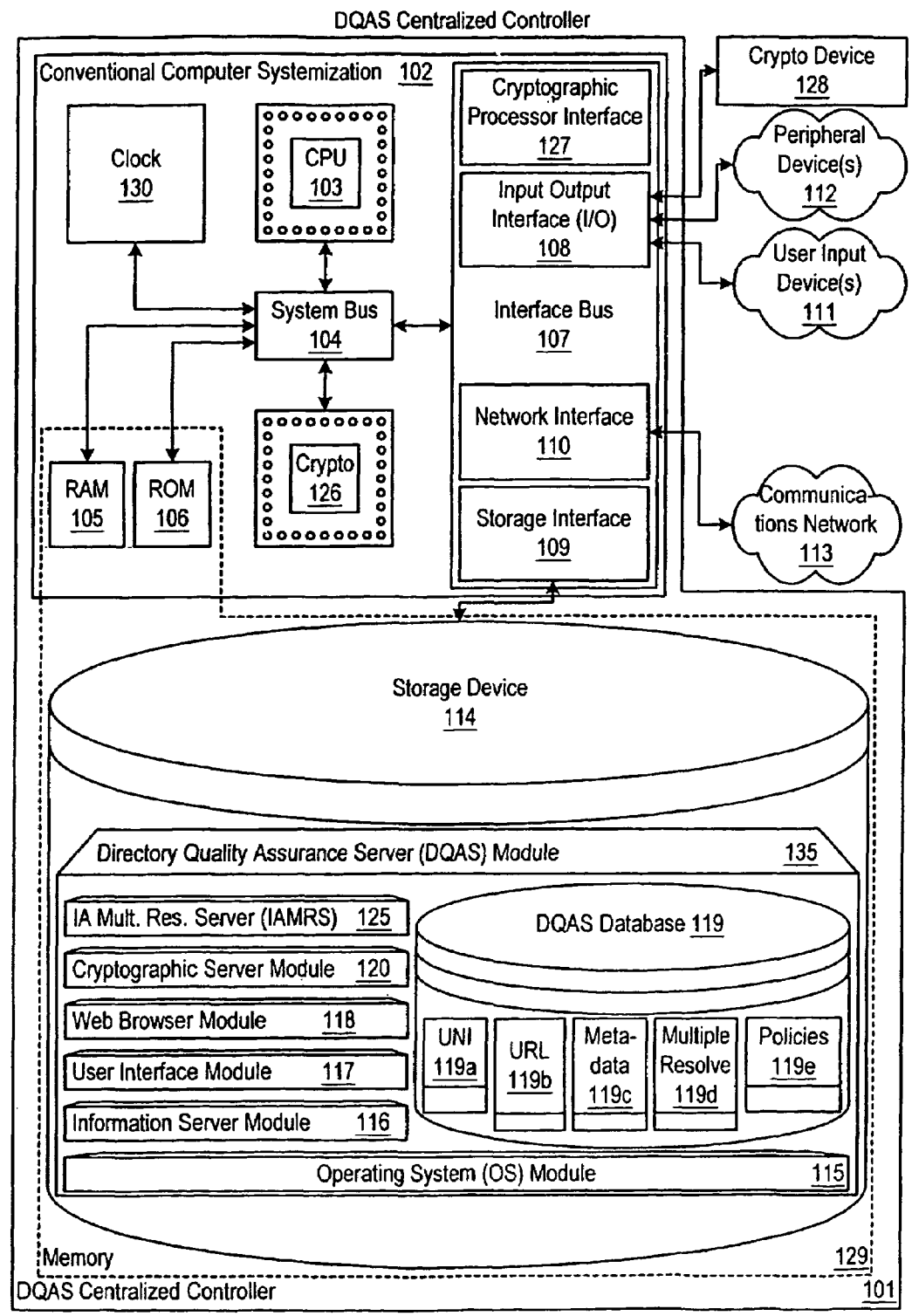
FIG. 1 illustrates one example embodiment incorporated into a Directory Quality Assurance Server (DQAS) controller.

FIG. 1 illustrates one example embodiment incorporated into a Directory Quality Assurance Server (DQAS) controller 101. In this embodiment, the DQAS controller 101 may serve to register, resolve, process, store, update, and validate Handles and any associated information, and/or the like.

In one embodiment, the DQAS controller 101 may be connected to and/or communicate with entities such as, but not limited to: one or more users from user input devices 111; peripheral devices 112; and/or a communications network 113. The DQAS controller may even be connected to and/or communicate with a cryptographic processor device 128.

A typical DQAS controller 101 may be based on common computer systems that may comprise, but are not limited to, components such as: a computer systemization 102 connected to memory 129.

Computer Systemization

A computer systemization 102 may comprise a clock 130, central processing unit (CPU) 103, a read only memory (ROM), a random access memory (RAM), and/or an interface bus 107, and conventionally, although not necessarily, are all interconnected and/or communicating through a system bus 104. The system clock typically has a crystal oscillator and provides a base signal. The clock is typically coupled to the system bus and various means that will increase or decrease the base operating frequency for other components interconnected in the computer systemization. The clock and various components in a computer systemization drive signals embodying information throughout the system. Such transmission and reception of signals embodying information throughout a computer systemization may be commonly referred to as communications. These communicative signals may further be transmitted, received, and the cause of return and/or reply signal communications beyond the instant computer systemization to: communications networks, input devices, other computer systemizations, peripheral devices, and/or the like. Optionally, a cryptographic processor 126 may similarly be connected to the system bus. Of course, any of the above components may be connected directly to one another, connected to the CPU, and/or organized in numerous variations employed as exemplified by various computer systems.

The CPU comprises at least one high-speed data processor adequate to execute program modules for executing user and/or system-generated requests. The CPU may be a microprocessor such as the Intel Pentium Processor and/or the like. The CPU interacts with memory through signal passing through conductive conduits to execute stored program code according to conventional data processing techniques. Such signal passing facilitates communication within the DQAS controller and beyond through various interfaces.

Interface Adapters

Interface bus(ses) 107 may accept, connect, and/or communicate to a number of interface adapters, conventionally although not necessarily in the form of adapter cards, such as but not limited to: input output interfaces (I/O) 108, storage interfaces 109, network interfaces 110, and/or the like. Optionally, cryptographic processor interfaces 127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (PCI), Personal Computer Memory Card International Association (PCMCIA), and/or the like.

Storage interfaces 109 may accept, communicate, and/or connect to a number of storage devices such as, but not limited to: storage devices 114, removable disc devices, and/or the like. Storage interfaces may employ connection protocols such as, but not limited to: (Ultra) Advanced Technology Attachment (Packet Interface) ((Ultra) ATA(PI)), (Enhanced) Integrated Drive Electronics ((E)IDE), Institute of Electrical and Electronics Engineers (IEEE) 1394, fiber channel, Small Computer Systems Interface (SCSI), Universal Ser. Bus (USB), and/or the like.

Network interfaces 110 may accept, communicate, and/or connect to a communications network 113. Network interfaces may employ connection protocols such as, but not limited to: direct connect, Ethernet (thick, thin, twisted pair 10/100/1000 Base T, and/or the like), Token Ring, wireless connection such as IEEE 802.11b, and/or the like. A communications network may be any one and/or the combination of the following: a direct interconnection; the Internet; a Local Area Network (LAN); Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface.

Input Output interfaces (I/O) 108 may accept, communicate, and/or connect to user input devices 111, peripheral devices 112, cryptographic processor devices 128, and/or the like. I/O may employ connection protocols such as, but not limited to: Apple Desktop Bus (ADB); Apple Desktop Connector (ADC); audio: analog, digital, monaural, RCA, stereo, and/or the like; IEEE 1394; infrared; joystick; keyboard; midi; optical; PC AT; PS/2; parallel; radio; Ser. ; USB; video interface: BNC, composite, digital, RCA, S-Video, VGA, and/or the like; wireless; and/or the like. A common output device is a video display, which typically comprises a CRT or LCD based monitor with an interface (e.g., VGA circuitry and cable) that accepts signals from a video interface. The video interface composites information generated by a computer systemization and generates video signals based on the composited information. Typically, the video interface provides the composited video information through a video connection interface that accepts a video display interface (e.g., a VGA connector accepting a VGA display cable).

User input devices 111 may be card readers, dongles, finger print readers, gloves, graphics pads, joysticks, keyboards, mouse (mice), trackballs, trackpads, retina readers, and/or the like.

Peripheral devices 112 may be connected and/or communicate with or to I/O and/or with or to other facilities of the like such as network interfaces, storage interfaces, and/or the like). Peripheral devices may be cameras, dongles (for copy protection, ensuring secure transactions as a digital signature, and/or the like), external processors (for added functionality), goggles, microphones, monitors, network interfaces, printers, scanners, storage devices, visors, and/or the like.

Cryptographic units such as, but not limited to, microcontrollers, processors 126, interfaces 127, and/or devices 128 may be attached, and/or communicate with the DQAS controller. A MC68HC16 microcontroller, commonly manufactured by Motorola Inc., may be used for and/or within cryptographic units. Equivalent microcontrollers and/or processors may also be used. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Other commercially available specialized cryptographic processors include VLSI Technology's 33 MHz 6868 or Semaphore Communications' 40 MHz Roadrunner 284.

Memory

A storage device 114 may be any conventional computer system storage. Storage devices may be a fixed hard disk drive, and/or other devices of the like. However, it is to be understood that a DQAS controller and/or a computer systemization may employ various forms of memory 129. For example, a computer systemization may be configured wherein the functionality of on-chip CPU memory (e.g., registers), RAM, ROM, and any other storage devices are provided by a paper punch tape or paper punch card mechanism; of course such an embodiment is not preferred and would result in an extremely slow rate of operation. In a typical configuration, memory 129 will include ROM, RAM, and a storage device 114. Generally, any mechanization and/or embodiment allowing a processor to affect the storage and/or retrieval of information is regarded as memory 129. Thus, a computer systemization generally requires and makes use of memory. However, memory is a fungible technology and resource, thus, any number of memory embodiments may be employed in lieu of or in concert with one another.

Module Collection

The storage devices 114 may contain a collection of program and/or database modules and/or data such as, but not limited to: an operating system module 115 (operating system); an information server module 116 (information server); a user interface module 117 (user interface); a web browser module 118 (web browser); databases 119; a cryptographic server module 120 (cryptographic server); Directory Quality Assurance Server (DQAS) module 125; and/or the like (i.e., collectively a module collection). These modules may be stored and accessed from the storage devices and/or from storage devices accessible through an interface bus. Although non-conventional software modules such as those in the module collection, typically and preferably, are stored in a local storage device 114, they may also be loaded and/or stored in memory such as: peripheral devices, RAM, remote storage facilities through a communications network, ROM, various forms of memory, and/or the like.

Operating System

The operating system module 115 is executable program code facilitating the operation of a DQAS controller. Typically, the operating system facilitates access of I/O, network interfaces, peripheral devices, storage devices, and/or the like. The operating system preferably is a conventional product such as Apple Macintosh OS X Server, AT&T Plan 9, Microsoft Windows NT Server, Unix, and/or the like operating systems. Preferably, the operating system is highly fault tolerant, scalable, and secure. An operating system may communicate to and/or with other modules in a module collection, including itself, and/or facilities of the like. Conventionally, the operating system communicates with other program modules, user interfaces, and/or the like. For example, the operating system may contain, communicate, generate, obtain, and/or provide program module, system, user, and/or data communications, requests, and/or responses. The operating system, once executed by the CPU, may enable the interaction with communications networks, data, I/O, peripheral devices, program modules, memory, user input devices, and/or the like. Preferably, the operating system provides communications protocols that allow the DQAS controller to communicate with other entities through a communications network 113. Various communication protocols may be used by the DQAS controller as a subcarrier transport mechanism for interacting with the Handle System, such as, but not limited to: multicast, TCP/IP, UDP, unicast, and/or the like.

Information Server

An information server module 116 is stored program code that is executed by the CPU. The information server may be a conventional Internet information server such as, but not limited to, Microsoft's Internet Information Server and/or the Apache Software Foundation's Apache. Preferably, the information server allows for the execution of program modules through facilities such as C++, Java, JavaScript, ActiveX, Common Gateway Interface (CGI) scripts, Active Server Page (ASP), and/or the like. Preferably the information server supports secure communications protocols such as, but not limited to, File Transfer Protocol (FTP); HyperText Transfer Protocol (HTTP); Secure Hypertext Transfer Protocol (HTTPS), Secure Socket Layer (SSL), and/or the like. Conventionally, an information server provides results in the form of web pages to web browsers, and allows for the manipulated generation of the web pages through interaction with other program modules. After a DNS resolution portion of an HTTP request is resolved to a particular information server, the information server resolves requests for information at specified locations on a DQAS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for "/myInformation.html" portion of the request and resolve it to a location in memory containing the information "myInformation.html." An information server may communicate to and/or with other modules in a module collection, including itself, and/or facilities of the like. Most frequently, the information server communicates with operating systems, other program modules, user interfaces, web browsers, and/or the like. An information server may contain, communicate, generate, obtain, and/or provide program module, system, user, and/or data communications, requests, and/or responses.

User Interface

A user interface module 117 is stored program code that is executed by the CPU. Preferably, the user interface is a conventional graphic user interface as provided by, with, and/or atop operating systems and/or operating environments such as Apple Macintosh OS, e.g., Aqua, Microsoft Windows (NT), Unix X Windows (KDE, Gnome, and/or the like), and/or the like. The user interface may allow for the display, execution, interaction, manipulation, and/or operation of program modules and/or system facilities through textual and/or graphical facilities. The user interface provides a facility through which users may affect, interact, and/or operate a computer system. A user interface may communicate to and/or with other modules in a module collection, including itself, and/or facilities of the like. Most frequently, the user interface communicates with operating systems, other program modules, and/or the like. The user interface may contain, communicate, generate, obtain, and/or provide program module, system, user, and/or data communications, requests, and/or responses.

Web Browser

A web browser module 118 is stored program code that is executed by the CPU. Preferably, the web browser is a conventional hypertext viewing application such as Microsoft Internet Explorer or Netscape Navigator (preferably with 128 bit encryption by way of HTTPS, SSL, and/or the like). Some web browsers allow for the execution of program modules through facilities such as Java, JavaScript, ActiveX, and/or the like. In one embodiment, web browsers are Handle-enabled by way of a browser plug-in software such as the Handle System plug-in available from www.cnri.org. In an alternative embodiment Handle support is integrated into the web browser. Web browsers and like information access tools may be integrated into PDAs, cellular telephones, and/or other mobile devices. A web browser may communicate to and/or with other modules in a module collection, including itself, and/or facilities of the like. Most frequently, the web browser communicates with information servers, operating systems, integrated program modules (e.g., plug-ins), and/or the like; e.g., it may contain, communicate, generate, obtain, and/or provide program module, system, user, and/or data communications, requests, and/or responses. Of course, in place of a web browser and information server, a combined application may be developed to perform similar functions of both. The combined application would similarly affect the obtaining and the provision of information to users, user agents, and/or the like from DQAS enabled nodes. The combined application may be nugatory on systems employing standard web browsers. Such a combined module could be configured to communicate directly with the DQAS without an intermediary information server to further enhance security.

DOAS Database

A DQAS database module 119 may be embodied in a database that is stored program code that is executed by the CPU and its stored data; the stored program code portion configuring the CPU to process the stored data. Preferably, the database is a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys.

Primary keys represent fields that uniquely identify the rows of a table in a relational database. More precisely, they uniquely identify rows of a table on the "one" side of a one-to-many relationship.

Alternatively, the DQAS database may be implemented using various standard data structures, such as an array, hash, (linked) list, struct, and/or the like. Such data structures may be stored in memory and/or in (structured) files. If the DQAS database is implemented as a data structure, the use of the DQAS database may be integrated into another module such as the DQAS module. Databases may be consolidated and/or distributed in countless variations through standard data processing techniques. Portions of databases, e.g., tables, may be exported and/or imported and thus decentralized and/or integrated. In one non-limiting example embodiment, the database module 119 includes tables such as but not limited to a UNI (e.g., Handle, DOI and/or other UNIs) table 119*a*, URL table 119*b*, metadata table 119*c*, multiple resolution table 119*d*, a policy table 119*e*, and/or the like. All the tables may be related by (enhanced) DOI key field entries as they are unique. In an alternative embodiment, these tables have been decentralized into their own databases and their respective database controllers (i.e., individual database controllers for each of the above tables). Of course, employing standard data processing techniques, one may further distribute the databases over several computer systemizations and/or storage devices. Similarly, configurations of the decentralized database controllers may be varied by consolidating and/or distributing the various database modules 119*a-e*. The DQAS may be configured to keep track of user requests and various transactions tracking via database controllers.

A DQAS database may communicate to and/or with other modules in a module collection, including itself, and/or facilities of the like. Most frequently, the DQAS database communicates with a DQAS module, other program modules, and/or the like. The database may contain, retain, and provide information regarding other nodes and data.

Cryptographic Server

A cryptographic server module 120 is stored program code that is executed by the CPU 103, cryptographic processor 126, cryptographic processor interface 127, cryptographic processor device 128, and/or the like. Preferably, cryptographic processor interfaces will allow for expedition of encryption and/or decryption requests by the cryptographic module; however, the cryptographic module, alternatively, may run on a conventional CPU. Preferably, the cryptographic module allows for the encryption and/or decryption of provided data. Preferably, the cryptographic module allows for both symmetric and asymmetric (e.g., Pretty Good Protection (PGP)) encryption and/or decryption. Preferably, the cryptographic module allows conventional cryptographic techniques such as, but not limited to: digital certificates (e.g., X.509 authentication framework), digital signatures, dual signatures, enveloping, password access protection, public key management, and/or the like. Preferably, the cryptographic module will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, RC5 (Rivest Cipher), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. The cryptographic module facilitates the process of "security authorization" whereby access to a resource is inhibited by a security protocol wherein the cryptographic module effects authorized access to the secured resource. A cryptographic module may communicate to and/or with other modules in a module collection, including itself, and/or facilities of the like. Preferably, the cryptographic module supports encryption schemes allowing for the secure transmission of information across a communications network to enable a DQAS module to engage in secure transactions if so desired by users. The cryptographic module facilitates the secure accessing of resources on DQAS and facilitates the access of secured resources on remote systems; i.e., it may act as a client and/or server of secured resources. Most frequently, the cryptographic module communicates with information servers, operating systems, other program modules, and/or the like. The cryptographic module may contain, communicate, generate, obtain, and/or provide program module, system, user, and/or data communications, requests, and/or responses.

Information Access Multiple Resolution Server (IAMRS)

An LAMRS module 125 is stored program code that is executed by the CPU. Generally, the DQAS affects accessing, obtaining and the provision of information, and/or the like between nodes on a communications network. The IAMRS has the ability to resolve UNIs to multiple instantiations. Generally, the IAMRS acts as a lookup facility to create, maintain, and update associations between a given piece of information, its DOI, and its current locations. The IAMRS coordinates with the DQAS database to identify nodes that may be useful for improving data transfer for requested information, for resolving to various formats of the requesting information, providing an enhanced mechanism to create queries regarding the information, and/or the like. An IAMRS enabling access of information between nodes may be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the IAMRS server employs a cryptographic server to encrypt and decrypt communications. The IAMRS may service requests, update association information for UNIs, and much more. A DQAS module may communicate to and/or with other modules in a module collection, including itself, and/or facilities of the like. Most frequently, the LAMRS module communicates with a DQAS database, operating systems, other program modules, and/or the like. The IAMRS may contain, communicate, generate, obtain, and/or provide program module, system, user, and/or data communications, requests, and/or responses.

Directory Quality Assurance Server (DQAS)

A DQAS module 135 is stored program code that is executed by the CPU. Generally, the DQAS tests, validates, and/or verifies UNIs so that users may access, obtain and provide information, between nodes on a communications network, and/or the like. The DQAS maintains the integrity between a UNI and its associated information by testing that the appropriate data is available at locations associated with the UNI. In one non-limiting example embodiment, the DQAS may be integrated into a UNI registration system (e.g., an Information Access Registration Server Controller (LARS)), which has the ability to register resource names (e.g., Handles) thereby effecting an association between the resource name and a piece of information and/or the information's location. Registration of a resource name may be associated with multiple instantiations. Generally, the IARS acts as a facility to create, maintain, register, and update associations between a given piece of information, its DOI, and its current locations. The DQAS may add the ability to validate UNIs to an IARS. Alternatively, the DQAS may operate in a stand alone mode separate from the LARS. In either embodiment, the DQAS may be used to generate tags, which are embedded into information represented by the DOI so that the information may be validated. The DQAS coordinates with the DQAS database to identify nodes that may be useful for validating UNI and associated information integrity, improving data transfer for requested information, resolving to various formats of the requesting information, providing an enhanced mechanism to create queries regarding the information, and/or the like. A DQAS enabling access of information between nodes maybe be developed by employing standard development tools such as, but not limited to: C++, shell scripts, Java, Javascript, SQL commands, web application server extensions, Apache modules, Perl scripts, binary executables, and/or other mapping tools, and/or the like. In one non-limiting example embodiment, the DQAS server employs a cryptographic server to encrypt and decrypt communications. The DQAS may service requests, redirect requests, update association information for UNIs, and much more. A DQAS module may communicate to and/or with other modules in a module collection, including itself, and/or facilities of the like. Most frequently, the DQAS module communicates with a DQAS database, an IAMRS module, and IARS module, operating systems, other program modules, and/or the like. The DQAS may contain, communicate, generate, obtain, and/or provide program module, system, user, and/or data communications, requests, and/or responses.

Distributed DQAS

The functionality of any of the DQAS node controller components may be combined, consolidated, and/or distributed in any number of ways to facilitate development and/or deployment. Similarly, the module collection may be combined in any number of ways to facilitate deployment and/or development. To accomplish this, one must simply integrate the components into a common code base or in a facility that can dynamically load the components on demand in an integrated fashion.

The module collection may be consolidated and/or distributed in countless variations through standard data processing and/or development techniques. Multiple instances of any one of the program modules in the program module collection may be instantiated on a single node, and/or across numerous nodes to improve performance through load balancing data processing techniques. Furthermore, single instances may also be distributed across multiple controllers and/or storage devices; e.g., databases.

All program module instances and controllers working in concert may do so through standard data processing communication techniques.

The preferred DQAS controller configuration will depend on the context of system deployment. Factors such as, but not limited to, the capacity and/or location of the underlying hardware resources may affect deployment requirements and configuration. Regardless of if the configuration results in more consolidated and/or integrated program modules, results in a more distributed series of program modules, and/or results in some combination between a consolidated and/or distributed configuration, communication of data may be communicated, obtained, and/or provided. Instances of modules (from the module collection) consolidated into a common code base from the program module collection may communicate, obtain, and/or provide data. This may be accomplished through standard data processing techniques such as, but not limited to: data referencing (e.g., pointers), internal messaging, object instance variable communication, shared memory space, variable passing, and/or the like (intra-application communication).

If module collection components are discrete, separate, and/or external to one another, then communicating, obtaining, and/or providing data with and/or to other module components may be accomplished through standard data processing techniques such as, but not limited to: Application Program Interfaces (API) information passage; (distributed) Component Object Model ((D)COM), (Distributed) Object Linking And Embedding ((D)OLE), and/or the like), Common Object Request Broker Architecture (CORBA), process pipes, shared files, and/or the like (inter-application communication). Messages sent between discrete module components for inter-application communication or within memory spaces of a singular module for intra-application communication may be facilitated through the creation and parsing of a grammar. A grammar may be developed by using standard development tools such as lex, yacc, and/or the like, which allow for grammar generation and parsing functionality, which in turn may form the basis of communication messages within and between modules. Again, the preferable embodiment will depend upon the context of system deployment.

Finally, it is to be understood that the logical and/or topological structure of any combination of the module collection and/or the present invention as described in the figures and throughout are not limited to a fixed execution order and/or arrangement, but rather, any disclosed order is exemplary and all functional equivalents, regardless of order, are contemplated by the disclosure. Furthermore, it is to be understood that such structures are not limited to Ser. execution, but rather, any number of threads, processes, services, servers, and/or the like that may execute asynchronously, simultaneously, synchronously, and/or the like are contemplated by the disclosure.

IP Addressing

Users access communications networks through addresses. Addresses represent locations. Users traverse locations in a communications network hoping to find information. A common communications addressing scheme employs the IP address. The IP address may be likened to the real world by analogy to a street address. The IP address itself is a sequence of numbers, e.g., 209.54.94.99, and commonly has an associated name, e.g., www.contentdirections.com. A distributed database registry maintains the associated pairs of names and IP addresses and serves to resolve associated names into corresponding IP addresses. This allows people to remember and use names, e.g., www.report.com, instead of being forced to memorize and use a series of numbers, e.g., 209.54.94.99. These distributed databases assisting in the name resolution of IP addresses are commonly referred to as Domain Name Servers (DNS).

It is common for IP addresses to be embodied as Universal Resource Locators (URLs) that append even more navigation information into an address. Users may employ software to access information stored at URLs through the use of HTTP. An example is when a user specifies "http://www.report.com/reports/1999/IncomeStatement.html" in a web browser. Typically this further navigation information, i.e., "/reports/1999/IncomeStatement.html," provides a specific storage location within a computer server. This further navigation location may be likened to a real world address more specific than a street address that includes information such as a company name, department, and room number. This further navigation location is typically not Handled or resolved by DNSs, but instead by an information server at the resolved IP address. For example, an information server at the resolved address of 123.123.123.123 for www.report.com would interpret and return information at a local location of "/reports/1999/IncomeStatement.html" within the server. An Information Server is a means for facilitating communications between a communication network and the computer server at a particular IP address. Commercial examples of an Information Server include Apache. An Information Server may be likened to a mail department for a business that further routes correspondence to appropriate locations within the business.

Figure 2:
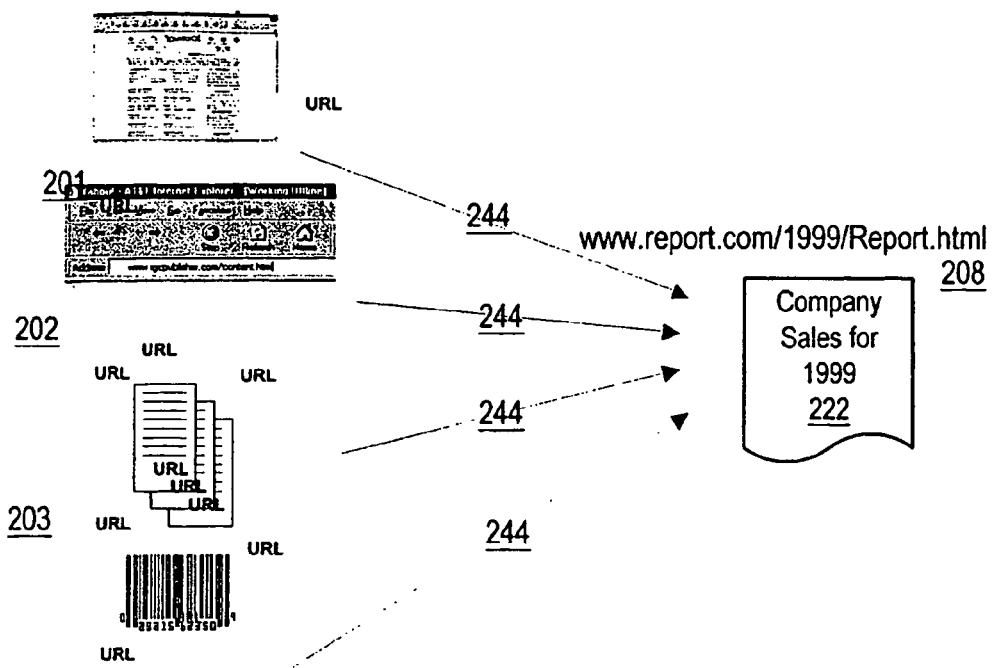
FIGS. 2 and 3 illustrate URL addressing across a communications network with moving information.
Figure 3:
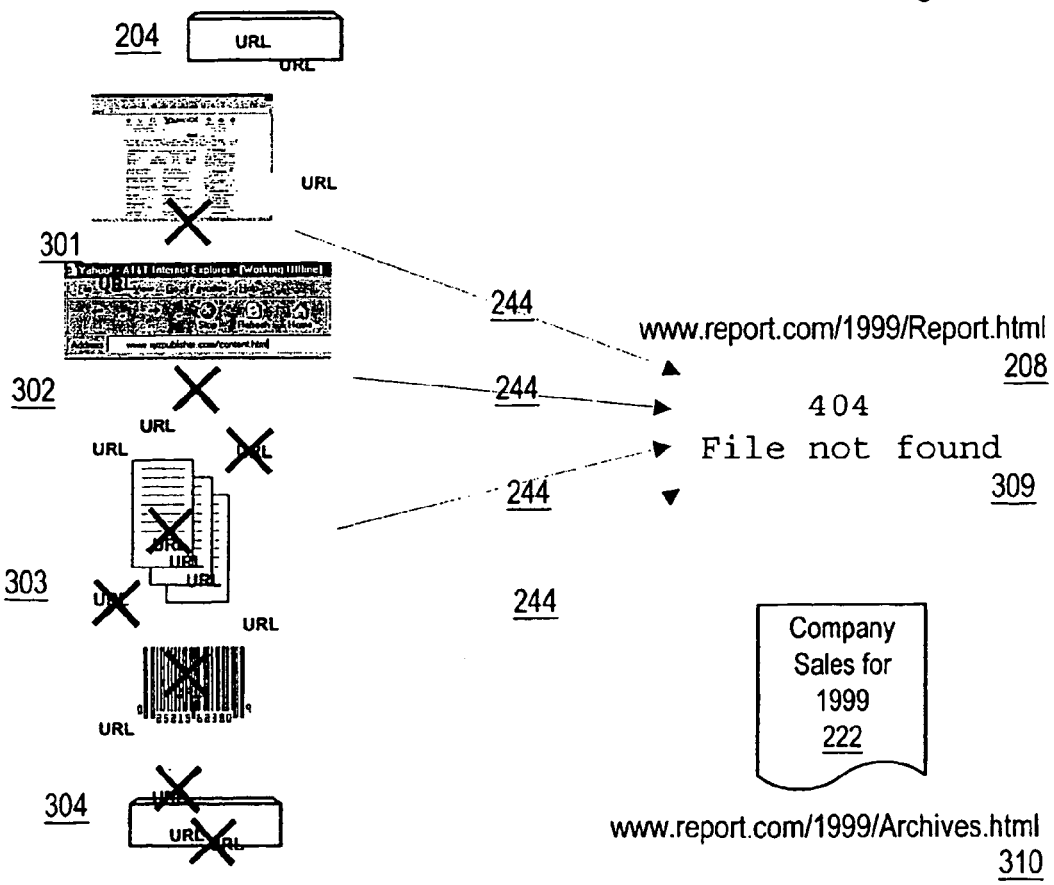

FIGS. 2 and 3 illustrate that IP addressing mechanisms do not maintain an association with information as it moves across a communications networks. Web page links generally employ HTTP, which in turn relies on IP addressing. Thus, URL links simply point to a location on a communication network and are not necessarily associated with any specific information. For example, a URL link referencing www.news.com will have different information associated between the URL and the information made available at the www.news.com location as information at the location is updated daily. In many instances, locations themselves may disappear as companies move information, move their operations, go out of business, etc.

For example, a report entitled "Company Sales for 1999" 222 existing at a location www.report.com/1999/Report.html 208 may be moved to www.report-archives.com/1999/Old-report.html 310, e.g., because the information was sold from one entity to another, archived, or for many other reasons. The report at www.report.com/1999/Report.html 208 may have had 5 million web pages and URL links referencing the location 244, and when users attempt to access the information they may well receive a "404 File not found" error 309 because that location no longer exists and/or no longer contains the desired information. The error results because the DNSs were designed to always resolve users' requests to a location and because DNSs are not designed to maintain an association between URLs and a specific instantiation of information.

FIG. 2 depicts a web page 201, a user entered address 202, a document 203, and a memory device 204 all employing URLs and consequently IP addressing in an attempt to reference a piece of information (the report "Company Sales for 1999") 222. Then in FIG. 2, the information 222 is moved from its original location 208 (for example at www.report.com/1999/Report.html) to a new location 310 of FIG. 2 (for example www.report.com/1999/Archives.html). In FIG. 3, this results in breaking 301-304 all the URLs 244 referencing the location and produces the dreaded "404 file not found" error 309 for all users and URLs making reference to the location (www.report.com/1999/Report.html) 208.

Handle System

Once a piece of information has been assigned a DOI and has been made available, the DOI system needs to be able to resolve what the user of the DOI wants to access. The technology that is used to manage the resolution of DOIs is better known as the "Handle System," and will be described in more detail below. THE DOI HANDBOOK provides a general overview of basic DOIs. In a nutshell, the Handle System includes an open set of protocols, a namespace, and an implementation of the protocols. The protocols enable a distributed computer system to store Handles (such as DOIs) of digital content and resolve those Handles into the information necessary to locate and access the content, to locate and access information related to the content, or to locate and access (i.e., provide an interface to) services associated with the content. This associated information can be changed as needed to reflect the current state of the identified content without changing the DOI, thus allowing the name of the item to persist over changes of location and other state information. Combined with a centrally administered DOI registration agency, the Handle System provides a general-purpose, distributed global naming service for the reliable management of information and services on networks over long periods of time. It is important to note that throughout the present disclosure that "source," "content" and/or "information" made accessible through the DOI system may comprise any identifiable content, source, information, services, transactions, and work of authorship, including articles, books, intangible objects, music albums, people, tangible physical objects, and/or the like further including selected discrete portions and/or combinations thereof. The accessible information may be a URL to an application that initiates a service, a transaction, provides a selection mechanism, and/or the like. In one non-limiting example, the DOI may even be associated with information identifying a human being such as a social security number, telephone number, and/or the like. In another non-limiting example, the DOI may be associated with software modules, programming "objects," or any other network-based resource. Furthermore, a DOI can be used to represent most anything including the online representation of physical products (e.g., items currently identified by UPC or bar codes). In such an example, DOIs could resolve to the manufacturer's catalog page describing or offering the product, or even, in a multiple-resolution scenario, offer all services related to the object such as where to go to get the item repaired; where to find replacement parts; what the new or replacement product is; what kinds of pricing or leasing options are available, etc. Other example embodiments implementing DOIs include: representing different modules of software that may operate in distributed fashion across a communications network; telephone numbers for Voice-over-IP technology; gene sequences; medical records and/or other permanent records (DOIs will be especially useful with permanent records protected via encryption and/or other method that might invoke a certificate or decryption key); and/or the like. Another example embodiment for a DOI is to represent the permanent location of a temporary and/or dynamic value such as, but not limited to a current stock quote; current bid and offer prices (for stocks and/or any other kind of auction and/or exchange); a company's current annual report (versus different DOIs for different prior-year annual reports); and/or the like.

Users may access information through Digital Object Identifiers (DOIs). DOIs are associated with (i.e., are names for) information itself. DOIs are instances of "Handles" and operate within the framework of the "Handle system." A DOI allows for access to persistently associated information. The DOI is a string of characters followed by a separator further followed by a string of characters, e.g., 10.1065/abc123def. It should be noted and re-emphasized that although the present disclosure may make mention of specific sub-types of UNIs such as "URNs," "DOIs" and "Handles," the present disclosure applies equally well to the more generic types of UNIs, and as such, the present disclosure should be regarded as applying to UNIs in general where any UNI sub-type is mentioned, unless stated otherwise. Furthermore, although the Handle System, DOIs, and their supporting technologies and conventions, which are in use today, are a contemplated forum for the present invention, it should be noted that it is contemplated that the present invention may be applied to other forums based upon current and yet to be conceived conventions and systems.

DOIs

Users employing DOIs to access information know they will resolve and access only associated information. In contrast to URLs that reference locations, DOIs are names for information, which can be used to look up that information's location and other attributes, as well as related services. It is envisioned that information may be any information as well as any computer-readable files, including e-books, music files, video files, electronic journals, software, smaller portions and/or combinations of any of the aforementioned content as well. It should be noted that since the electronic content will be made available over a communications network, hereinafter this application refers to such available information as being published on a communications network.

A DOI is a permanent and persistent identifier given to a piece of information made available on a communications network and registered in an electronic form, so that even if the location (i.e., URL), format, ownership, etc. of the content or associated data changes, users will be able to access the associated data. DOIs, or Handles, may be distributed to users in lieu of a URL. A user may access information associated with a particular DOI by selecting or entering the DOI in a Handle-enabled web browser much like a URL hyperlink. Many types of browsers may be enabled by way of browser plug-in software such as the Handle System plug-in available from www.cnri.org. Such an attempt to access DOI associated information triggers an automated process to look up a resource's current location. The current location of the resource is associated with the resource's DOI in a centrally managed directory made available by the Handle System, which in turn directs the user (i.e., the user's web browser) to the resource's current location. This direction is often accomplished by returning a current URL associated with the selected DOI and corresponding information.

Figure 4:
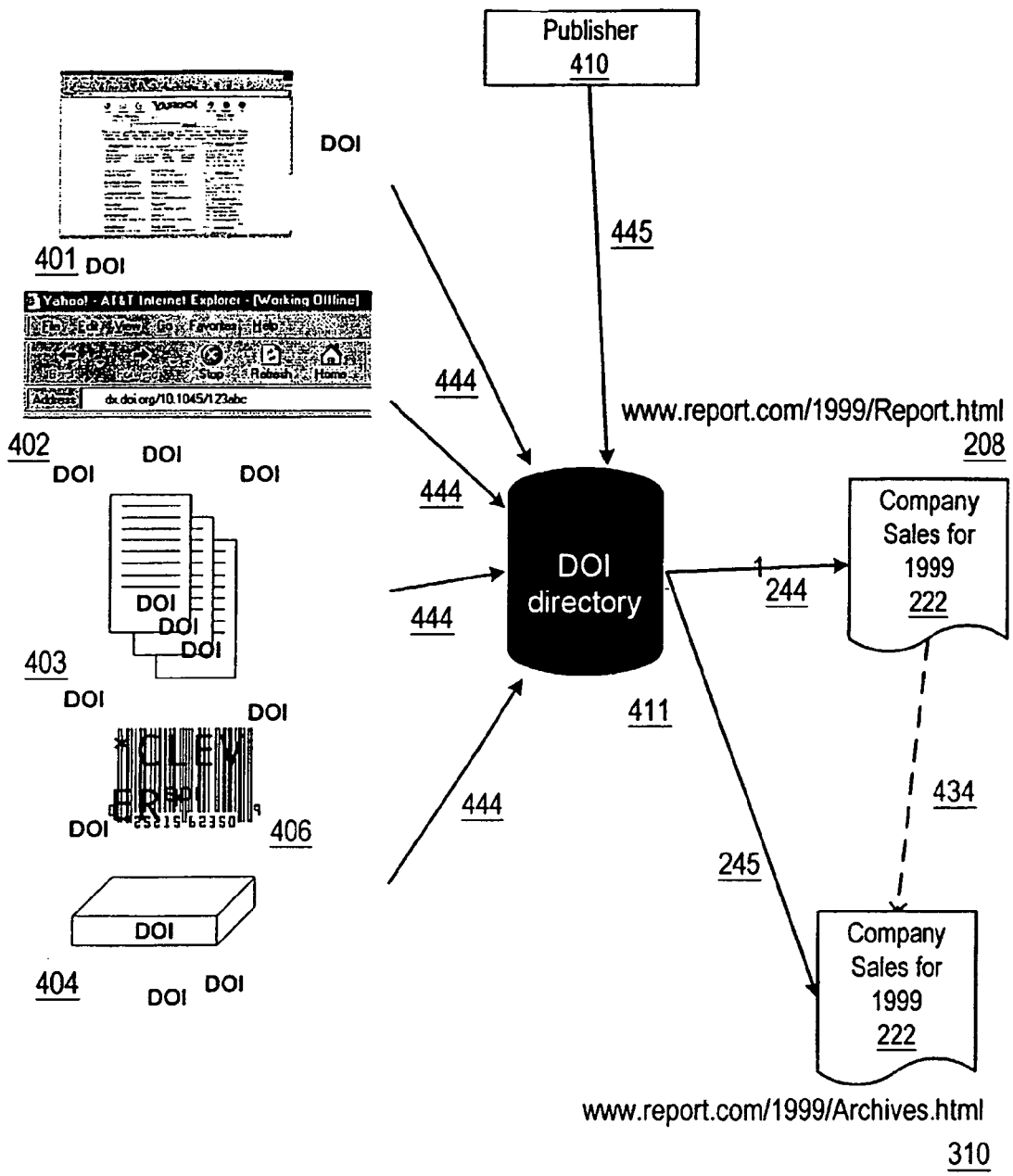
FIG. 4 illustrates accessing of information through DOIs.

FIG. 4 illustrates the access of information through DOIs in contrast to FIGS. 2 and 3 above. Initially, the information (report of "Company Sales" for 1999) 222 is given a DOI through a registration process. Instead of employing URLs, users reference 444 the information using the DOI through web pages 401, typed entry in a web browser 402, documents 403, devices 404, barcodes 406, and/or the like. When users engage the DOI links 444, they are resolved in a centralized DOI directory 411 and the requesting users are given a URL link 244 to the information's 222 initial location (www.report.com/1999/Report.html) 208. Upon the information being moved 434 from its initial location (www.report.com/1999/Report.html) 208 to a new location (www.report.com/1999/Archives.html) 310, the publisher of the information 410 would inform the DOI centralized directory 445 of the new location for the information by sending an updated URL 245 referencing the new location. Thereafter, if users 401-404 attempt to access the information through the DOI links 444, the DOI directory will properly provide the new location 310 by way of the updated URL 245.

As noted above, DOIs may not only be used to identify information, but also smaller portions thereof. For example, according to the DOI system, it is possible for a book to have one DOI, while each of its chapters would have other unique DOIs to identify them; furthermore, each figure in the book may have yet other unique DOIs to identify them. In other words, according to the DOI system, it is possible to identify information with variable granularity as desired by the content publishers. Furthermore, it is envisioned that just as Universal Product Codes (commonly expressed as 'bar-codes' on consumer products) allow, for example, a supermarket's cash registers, inventory computers, financial systems, and distributors to automate the supply chain in the physical world, the present disclosure provides a mechanism for employing DOIs to empower all kinds of agents in the world of electronic publishing to automate the sale of digital content (and the licensing of rights to that content) across the Internet in an efficient manner, since each piece of saleable content would have associated with it a globally unique DOI, which could be used as a product identification code in transactions between agents.

Handle Structure

The Handle System employs a pre-determined set of policies for efficient and user-friendly utilization thereof, some of which of which are listed below. The use of the Handle System for DOI resolution should ideally be free to users, with the costs of operation of the system possibly borne by the publishers. All DOIs are to be registered with a global DOI registry. Registrants are responsible for the maintenance of state data and metadata relating to DOIs that they have registered. The syntax of the DOI follows a standardized syntax. In use, the DOI will be an opaque string (dumb number). DOI registration agencies will manage the assignment of DOIs, their registration and the declaration of the metadata associated with them.

Figure 5:
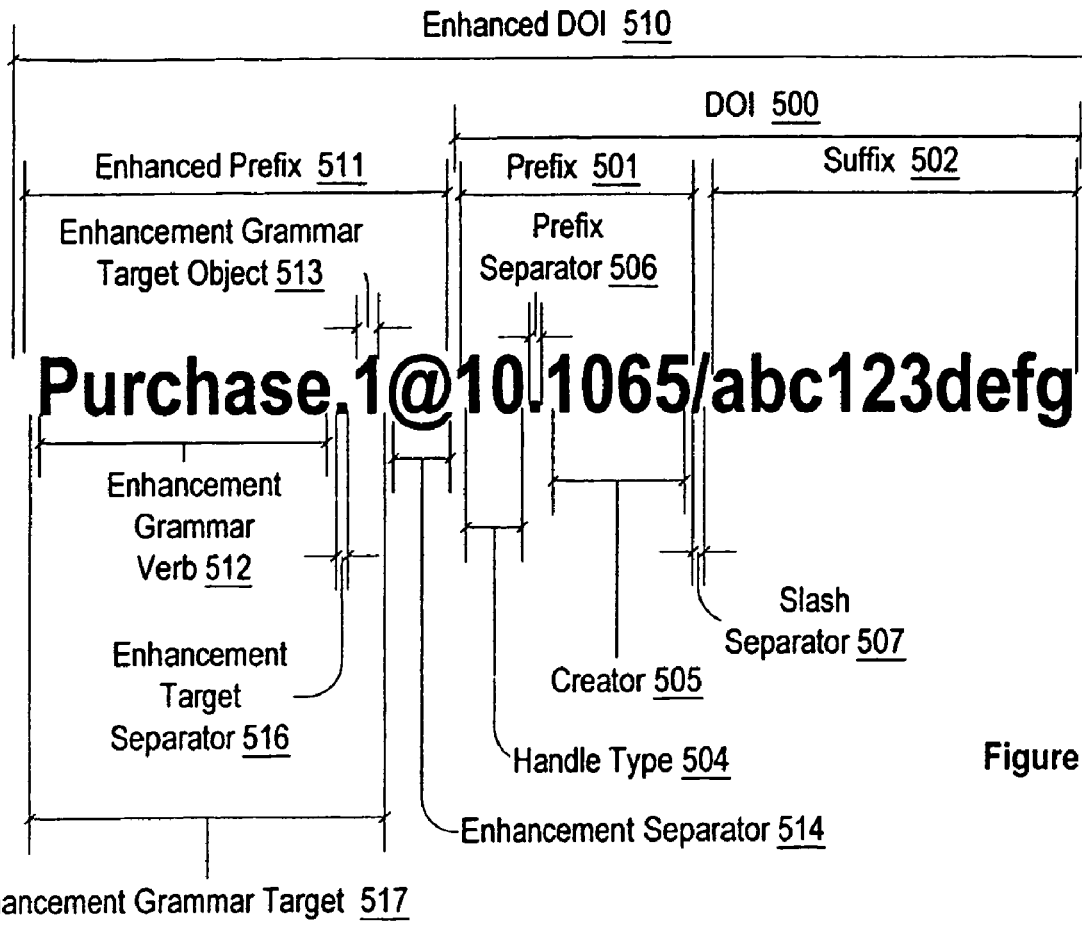
FIGS. 5 and 6 provide an overview of a Handle.
Figure 6:
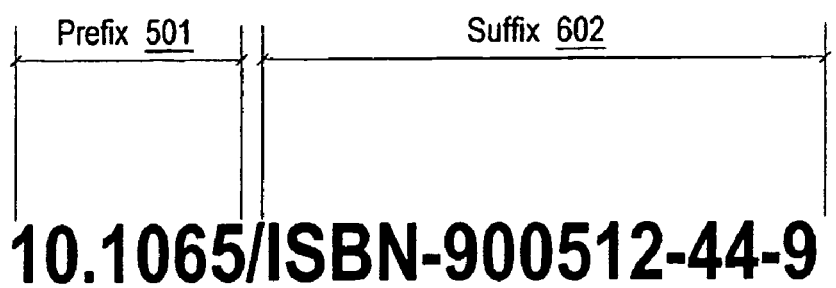

FIGS. 5 and 6 provide a schematic view of a Handle 600. A Handle 600 has two components, the prefix 501 and the suffix 602. The prefix 501 and the suffix 502 are separated by a forward slash 507. The Handle 500 may incorporate any printable characters from almost every major language written or used today. There is no specified limitation on the length of either the prefix 501 or the suffix 502. As a result, it is envisioned that there are an almost infinite number of Handles available. It is important to ensure that the combination of the prefix 501 and the suffix 502 is unique for supporting the integrity of the Handle System. Thus, the DOI registration agency will award a unique prefix 501 to a publisher. In one embodiment; the registration agency may put the responsibility on these publishers for ensuring that the suffix 502 assigned is unique as well. This may be achieved with a registration tool running on the user's client computer system. In another embodiment, the registration agency will ensure that the suffix 502 is unique by applying various suffix generation algorithms as discussed throughout this disclosure. The Registration Agency and the Handle System administrators will both verify uniqueness of any new Handle before depositing it in the Handle System. The Registration Agency deposits DOI records with the Handle System. The Handle System in turn services DOI resolution requests through a DOI directory.

The prefix 501 itself has two components separated by a prefix separator 506, which is a period. The first part of the Handle prefix is the Handle type 504. The second part of the Handle prefix is the Handle creator 505. The Handle type 504 identifies what type of Handle system is being used. When the Handle type 504 starts with a "10" the Handle is distinguished as being a DOI as opposed to any other implementation type of the Handle System. The next element of the prefix, separated by a period, is the Handle creator 505, which is a number (or string of characters) that is assigned to an organization that wishes to register DOIs. Together, these two elements 504 and 505 form the unique publisher prefix portion of the DOI. There is no limitation placed on the number of Handle (or specifically DOI) prefixes that any organization may choose to apply for. As a result, a publishing company, for example, might have a single DOI prefix 501, or might have a different one for each of its journals, or one for each of its imprints.

While generally a prefix 501 may be a simple numeric string, the scope of the Handle System is not limited thereby. Thus, a prefix 501 may also utilize alphabetical characters or any other characters.

The suffix 502 is a unique string of alphanumeric characters, which, in conjunction with a particular prefix 501, uniquely identifies a piece of information. It should be appreciated that the combination of the prefix 501 for a publisher and the unique suffix 502 provided by the publisher avoids the need for the centralized allocation of DOI numbers. The suffix 502 may be any alphanumeric string that the publisher chooses, so long as it is unique among all suffixes registered in conjunction with the publisher's prefix.

FIG. 6 provides a view of another embodiment of the DOI 600, in which a textbook's ISBN number serves as the suffix 602. Consequently, where it is convenient, the publisher of the underlying content may choose to select as the suffix 602 any other identification code accorded to the original piece of content.

Enhanced DOI

FIG. 5 further illustrates an enhanced DOI 510 grammar. One non-limiting example embodiment of an enhancement to the DOI grammar is embodied as an enhanced prefix 511. However, it is fully contemplated that an alternative and/or complimentary enhanced suffix (not illustrated) may be similarly appended to the DOI 500. The enhanced prefix 511 is comprised of an enhancement grammar target 517 and enhancement separator 514, which is an "@" symbol, but it is understood any other character may be designated as the enhancement separator. The enhancement grammar target 517 may itself be any string of characters other than the enhancement separator 514. The enhancement grammar target 517 may be employed for the purpose of having the DOI 500 resolve to multiple versions of a specified information as will be described in greater detail throughout this disclosure. In a further enhanced embodiment, the enhancement grammar target 517 may itself be further comprised of an enhancement grammar verb 512 and enhancement grammar target object 513 separated by an enhancement target separator 516, e.g., a period. Of course the enhancement target separator 516 may be designated as any character(s). In one example embodiment, the enhancement grammar verb 512 acts as a modifier to select amongst a plurality of multiple resolution targets for a DOI, and the enhancement grammar target object 513 is a value passed to the target object and/or a Handle system resolution server for further action.

Handle System Metadata

A DOI 500 is merely an identification number that does not necessarily convey any information about its associated information. As a result, it is desirable to supplement the DOI with additional information regarding the addressed information to enable users to perform efficient and user-friendly searches for retrieving the desired content over a communications network. To allow easy identification of information, the present invention provides for the use of metadata, which is descriptive data about the identified information. While metadata may be any data structure that is associated with a DOI, according to one embodiment, the metadata will be comprised of a few basic fields that can accurately and succinctly identify the published information. According to this embodiment, the metadata will comprise an identifier associated with the entity from a legacy identifier scheme such as the International Standard Book Number (ISBN) for a book, title of the published content, type of content being published (such as book, music, video, etc.), whether the content is original or a derivation, a primary author of the content, the role of the primary author in creating the content, the name of the publisher, and/or the like. As different types of content may require different metadata for describing it, one aspect of the DOI system envisions the use of different metadata for different types of content.

According to one example embodiment, metadata will be made available to any user of the DOI system to enable them to find the basic description of the entity that any particular DOI identifies. This basic description will allow the user to understand some basic things about the entity that published the content or the content itself.

As a result, to find out what information the DOI identifies, it is desirable to resolve it, and then review associated metadata because the DOI links the metadata with the content it identifies and with other metadata about the same or related content. In one embodiment, the metadata allows for the recognition of the information identified by the DOI 500 as well as its unambiguous specification. The metadata will also allow for the interaction between the information and other contents in the network (and with metadata about those entities).

DOI Information Access

Figure 7:
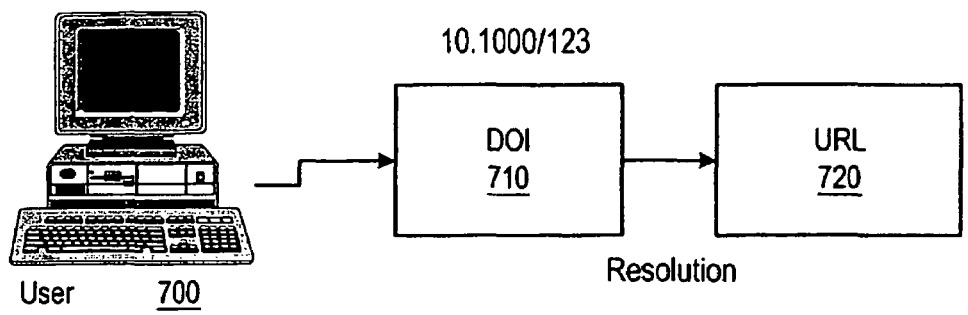
FIGS. 7 and 8 provide an overview of the resolution mechanism for allowing users to access desired information.
Figure 8:
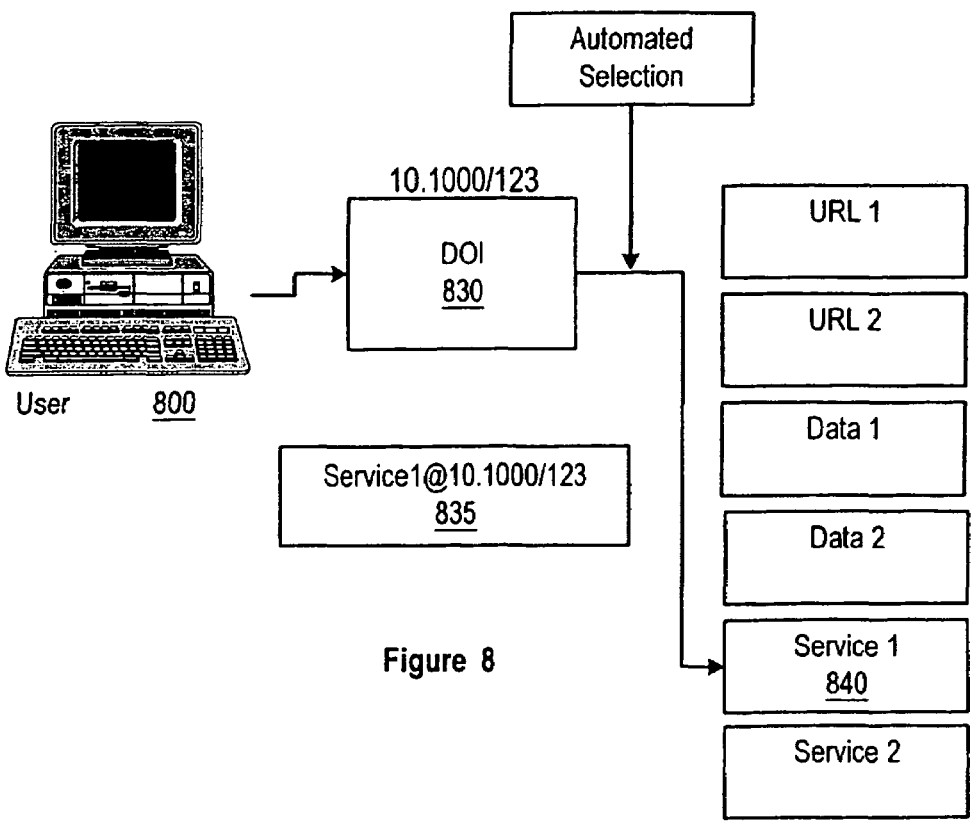

FIGS. 7 and 8 provide an overview of the resolution mechanism for allowing users to access the desired information by merely providing the DOI to the DOI Handle system. Resolution in the present context includes the submitting of an identifier to a network service and receiving in return one or more pieces of current information related to the identifier. According to one embodiment of the DOI system, shown in FIG. 7, the user uses her web browser 700 client to point to content identified by a particular DOI 710. This DOI 710 has only one URL associated with it, and must resolve to that URL. As a result, when the user makes a request for underlying content identified by a particular DOI 710, the user is directed to URL 720, where the desired content lies.

As such, this mechanism allows the location of the information to be changed while maintaining the name of the entity as an actionable identifier. If the publisher changes the location of the content, the publisher must merely update the DOI's entry in the Handle System database to ensure that the existing DOI 710 points to the new location of the content. As a result, while the location of the content has changed, the DOI remains the same and users are able to access the content from its new location by using the existing DOI.

FIG. 8 provides an overview of a DOI system where users may use a DOI for resolving a request for one piece of content, out of a plurality of available identical copies of the same piece of content that are identified by the sane DOI, as well as the location of data about the piece of content, and services associated with the content (such as purchasing the content). Thus, the user uses the web browser 800 and provides the necessary DOI 830. The DOI 830 may be structured to describe the type of service desired 835. As a result, the DOI system is able to resolve the particular piece of content 840 that the user desires to access.

Figure 9:
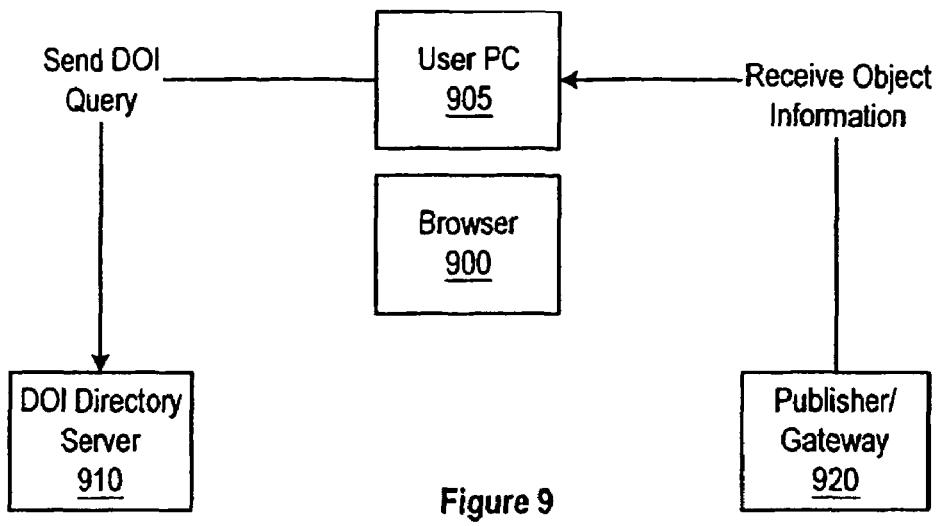
FIG. 9 provides an overview of an exemplary sequence of actions that a user performs to access information using DOIs.

FIG. 9 provides an overview of the sequence of actions that a user performs to access information, in accordance with the present invention. Initially, the user launches the browser client 900 on a computing device 905, such as personal computer, personal digital assistant (PDA), and/or the like. The user engages the browser 900 to make a DOI query. The DOI query is forwarded to the DOI Directory Server 910 over a communications network. The system of the DOI Directory Server 910 examines the DOI against the entries stored therein and forwards the appropriate URL to the browser 900 on the user's computer 900, in a manner that is invisible to the user. As a result, the browser is pointed to the desired content on a server with the appropriate publisher information 920. Finally, upon receipt of the request from the user's browser, the publisher 920 forwards the desired information to the user, which may be accessed in the browser client 900.

Figure 10:
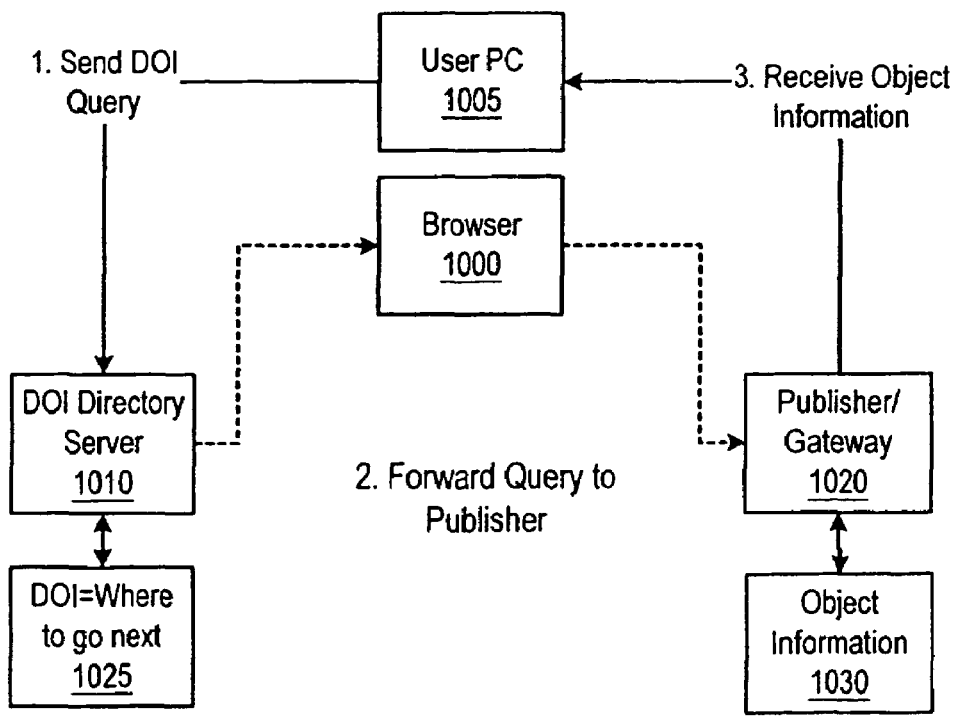
FIG. 10 provides a more complete overview of an exemplary sequence of actions that users perform to access content information.

FIG. 10 provides a more complete view of the sequence of actions that a user performs to access content information, as shown in FIG. 9. As noted above, the user launches the browser client 1000 on a computing device 1005. The user engages the browser 1000 to make a DOI query. The DOI query is forwarded to the DOI Directory Server 1010 over the communications network. The system of the DOI Directory Server 1010 examines the DOI against the entries stored therein. As a result of the checking of the DOI against the entries stored in the DOI Directory Server 1010, the DOI Directory Server 1010 determines where the DOI must lead the user 1025. The appropriate URL for the content is automatically forwarded to the user's browser 1000, without any intermediate intervention or action by the user. As a result, the browser 1000 is pointed to the appropriate publisher 1020 whose server is addressed by the underlying URL. The URL is used by the publisher's server 1020 to determine the exact location for content desired by the user, and the publisher's server 1020 forwards the appropriate content 1030 to the user.

Figure 11:
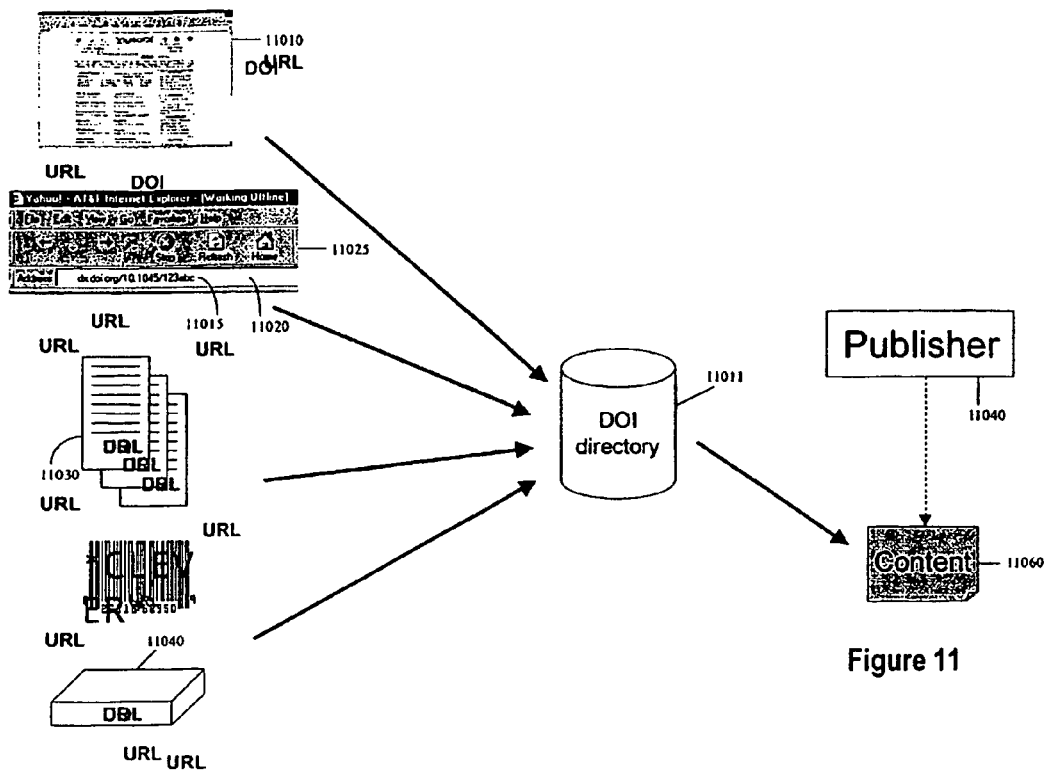
FIG. 11 illustrates an exemplary mechanism for accessing information over a communications network.

FIG. 11 provides an overview of some of the exemplary mechanisms for accessing information over a communications network by resolving a DOI to obtain the URL where the desired content is located, in accordance with the present invention. According to one embodiment, the user may directly provide the DOI and the DOI system retrieves and forwards the appropriate content to the user by simply linking to the appropriate URL. According to another embodiment, the user may provide information related to some of the fields included in the metadata, whereupon a DOI lookup service identifies the appropriate DOI, which in turn may be resolved to the desired content's location. As shown in FIG. 11, according to one embodiment, a search engine 11010 may be provided to a user. In one embodiment, the search engine is offered and disposed in communication with the registration agency's DOI and metadata database. In an alternative embodiment, a search engine such as www.google.com may be adapted to submit queries to the registration agency's databases. The user searches for the appropriate DOI by providing some identifying information to the search engine 11010. The search engine 11010 uses the identifying information provided and searches a database of metadata to retrieve the DOI associated with the provided metadata information. Thus the user conducting the search may be presented with returned DOIs from the metadata database and/or URLs resolved from said returned DOIs. The retrieved DOI is sent to the DOI directory 11011, which resolves the URL wherein the desired content is located by a publisher 11040. Finally, the user's browser is pointed to the appropriate content 11060.

According to another embodiment, the user may provide the DOI 11015 in the address window 11020 of a browser 11025. If the user's web browser is not capable of natively processing DOIs, then the DOI 1015 may contain the address of a proxy server for the DOI directory 11011, which in FIG. 11 is "dx.doi.org." As a result, the browser is pointed to the DOI directory 11011 located at dx.doi.org, which resolves the URL at which the desired content is located by a publisher 11040 and points the user's browser thereto.

According to another embodiment, the DOI may be embedded in a document or some form of information 11030, whereupon clicking the DOI directs the user to the appropriate DOI directory 11011, which determines the URL at which the desired content is located and points the user's browser thereto.

According to another embodiment, the DOI may be provided on a memory 11040, such as a CD-ROM or a floppy disk, whereupon the memory may automatically, or upon being activated, direct the user to the appropriate DOI directory 11011, which resolves the URL at which the desired content is located and points the user's browser thereto.

According to yet another embodiment, the DOI may be provided in printed form to a user, who enters the DOI manually as above or by way of optical and/or mechanical peripheral input device.

Figure 12:
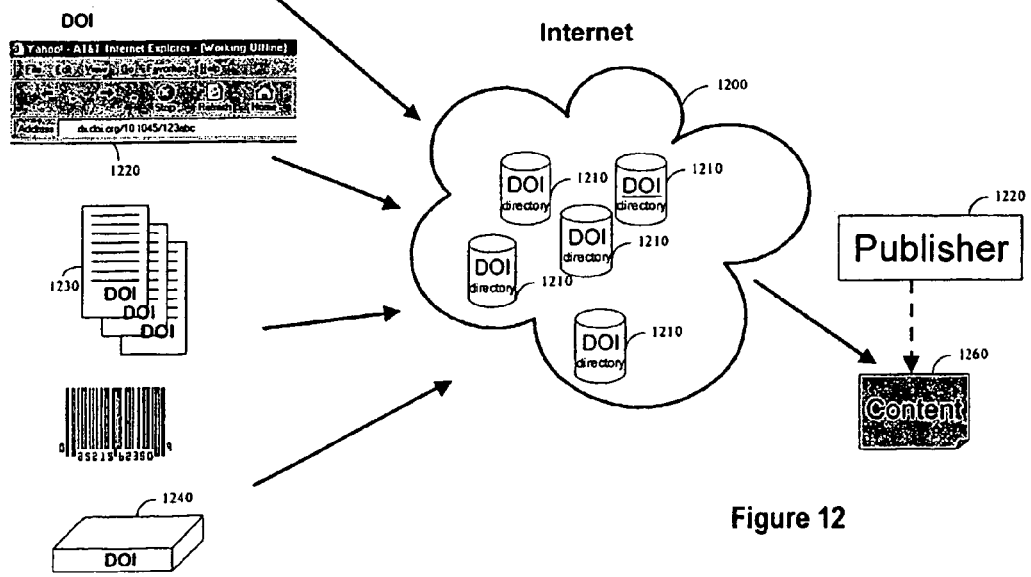
FIG. 12 provides an overview of another embodiment of exemplary mechanisms for retrieving information over a communications network.

FIG. 12 provides an overview of another embodiment of the exemplary mechanisms for retrieving information over a communications network, whereupon the DOI system resolves a DOI to obtain the URL where the desired information is located. According to this embodiment, a plurality of DOI directories 1210 exist as a distributed DOI directory and form a Handle System 1200. In one embodiment, the distributed DOI directory acts and responds to requests as if it were a singular directory 11011. Otherwise resolutions take place similarly as in FIG. 11.

Figure 13:
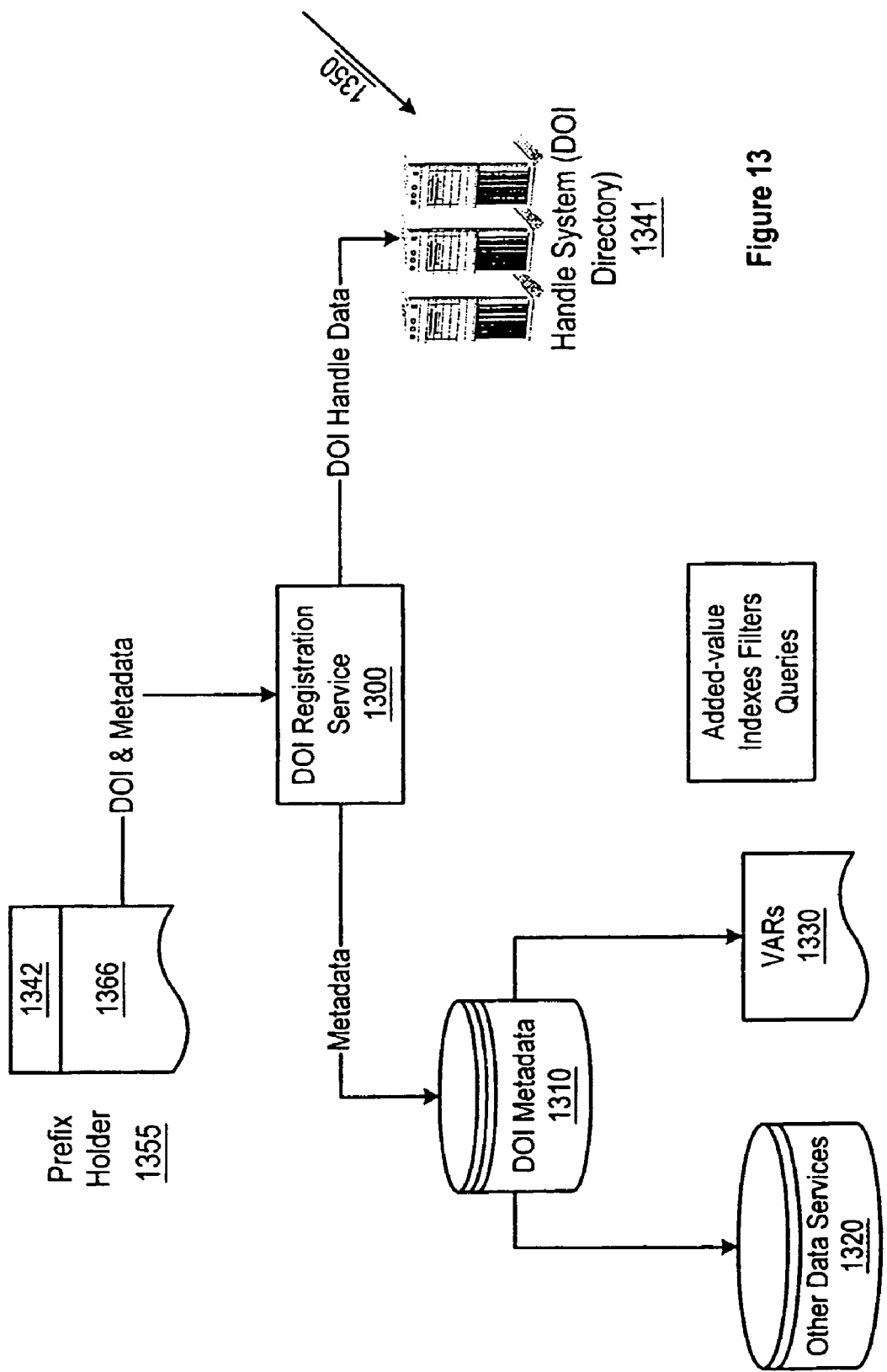
FIG. 13 provides an overview of an exemplary DOI system.

FIG. 13 provides an overview of an exemplary DOI system, in accordance with the present invention, wherein the publishers, the DOI registration service and the Handle System collaborate together to create an efficient DOI system. The prefix holder 1355 may submit information to a DOI registration service 1300 comprising a DOI 1342 and associated metadata 1366. The prefix holder who has already been assigned a unique prefix 501, requests that a suffix 502 be assigned to a piece of content 1366. The registration service 1300 is responsible for parsing and/or reformatting the user's streams of submitted information 1342, 1366 for subsequent deposit in a Handle system 1350 and/or metadata database 1310. As noted above, the scope of the content that can be addressed using a DOI is unlimited. As a result, the content 1366 may comprise any information and work of authorship, including articles, books, music albums, or selected discrete portions thereof. In addition to providing a DOI 500, the publisher 1342 collects metadata for the content 1366. The metadata may comprise the content's DOI 500, a DOI genre, an identifier, title, type, origination, primary agent, agent's role, and/or the like. It may also comprise listings of associated services having to do with the identified piece of content offered by various parties, such as the locations of web pages where a piece of content may be purchased online.

Once the publisher 1342 has assigned the suffix 502 to the content 1366 and collected the necessary metadata, the DOI 500 and the metadata are transmitted to the DOI registration service 1300. The DOI registration service 1300 maintains a database of DOIs 500, metadata of all the registered content 1366, as well as the URL at which the content 1366 is located. According to the present invention, the DOI registration service 1300 forwards the metadata to a metadata database 1310, 119c of FIG. 1, which may or may not be integrally maintained by the DOI registration service 1300.

The DOI registration service 1300 may use the collected metadata for providing it to other data services 1320 or for providing value added resources 1330 to the users. In addition, the DOI registration service 1300 sends the appropriate DOI Handle data to the Handle System 1350, which may comprise a plurality of DOI Directory Servers 1341.

Handle System Multiple Resolution Model

Figure 14:
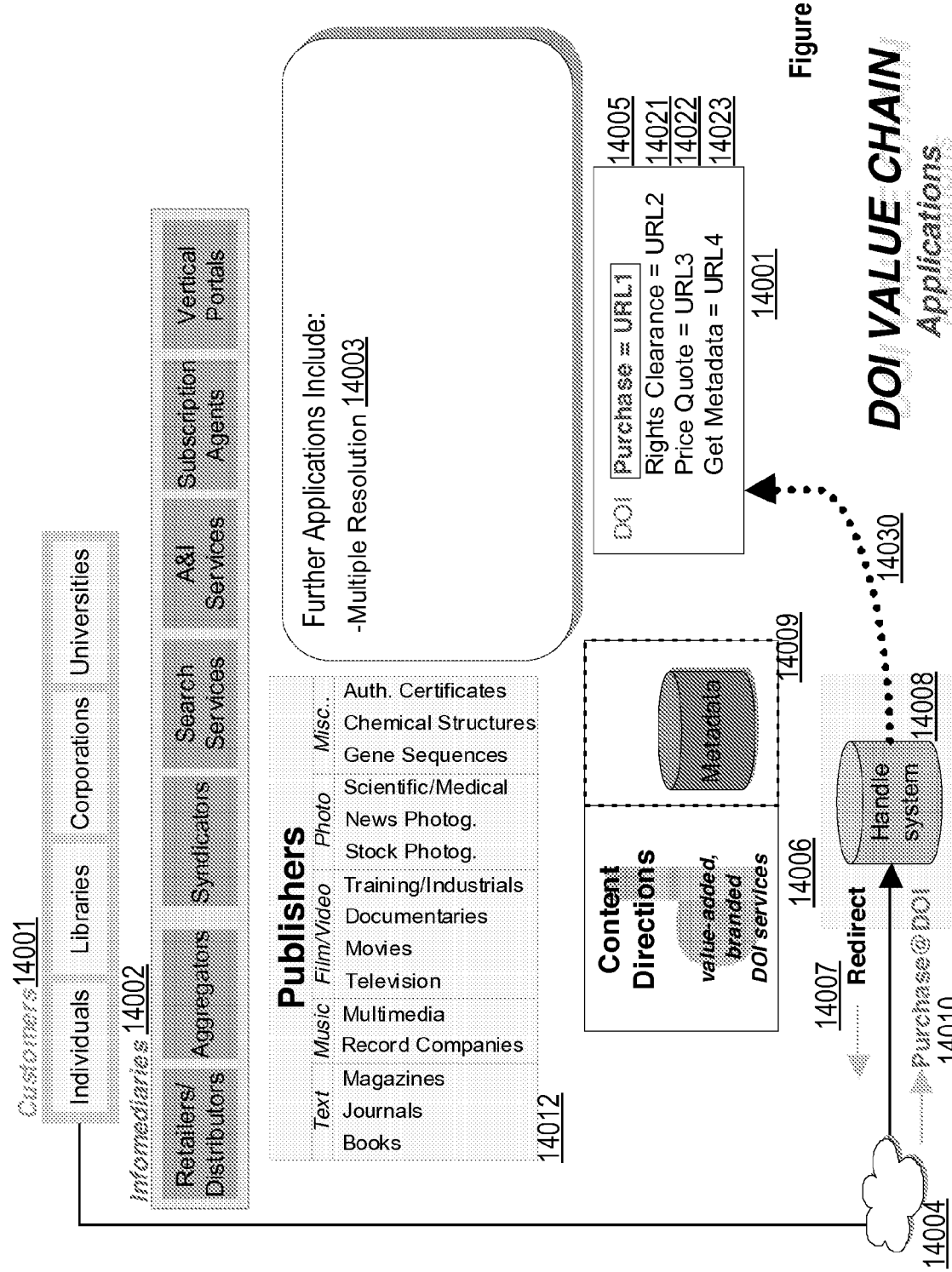
FIG. 14 illustrates one non-limiting example of the Directory Quality Assurance Server (DQAS) interacting with various entities.

FIG. 14 illustrates one non-limiting example of the IAMRS 14006 interacting with various entities. Publishers 14012 may wish to make their information available through different locations, in different formats, in different contexts, for different purposes and uses. In so doing, publishers may register a single DOI 14001 in an enhanced Handle system 14008 with multiple resolutions 14005, 14021-14023. In part, the enhanced system is a multiple resolution system. Publishers may wish to provide multiple resolutions for a DOI to enhance the use and access of their information to customers 14001 such as individuals, libraries, corporations, universities, and/or the like, and information resellers (infomediaries) 14002 such as retailers/distributors, aggregators, syndicators, search services, Abstracting & Indexing services, subscription agents, vertical portals, and/or the like. For example, retailers/distributors 14002 may require a publisher's information to be located on its servers so as to properly account and charge for access to the information; in such a case an enhanced DOI service request 14010 by customers 14001 through a communication network 14004 to an enhanced Handle system 14008 would select 14030 a PURCHASE record associated with URLI 14005. URLI would then be redirected back to the customer 14007 through the communications network 14004. Publishers may also provide various locations for rights clearance 14021, price quotes 14022, and accessing metadata 14009, 14023.

Handle System Registration Model

Figure 15:
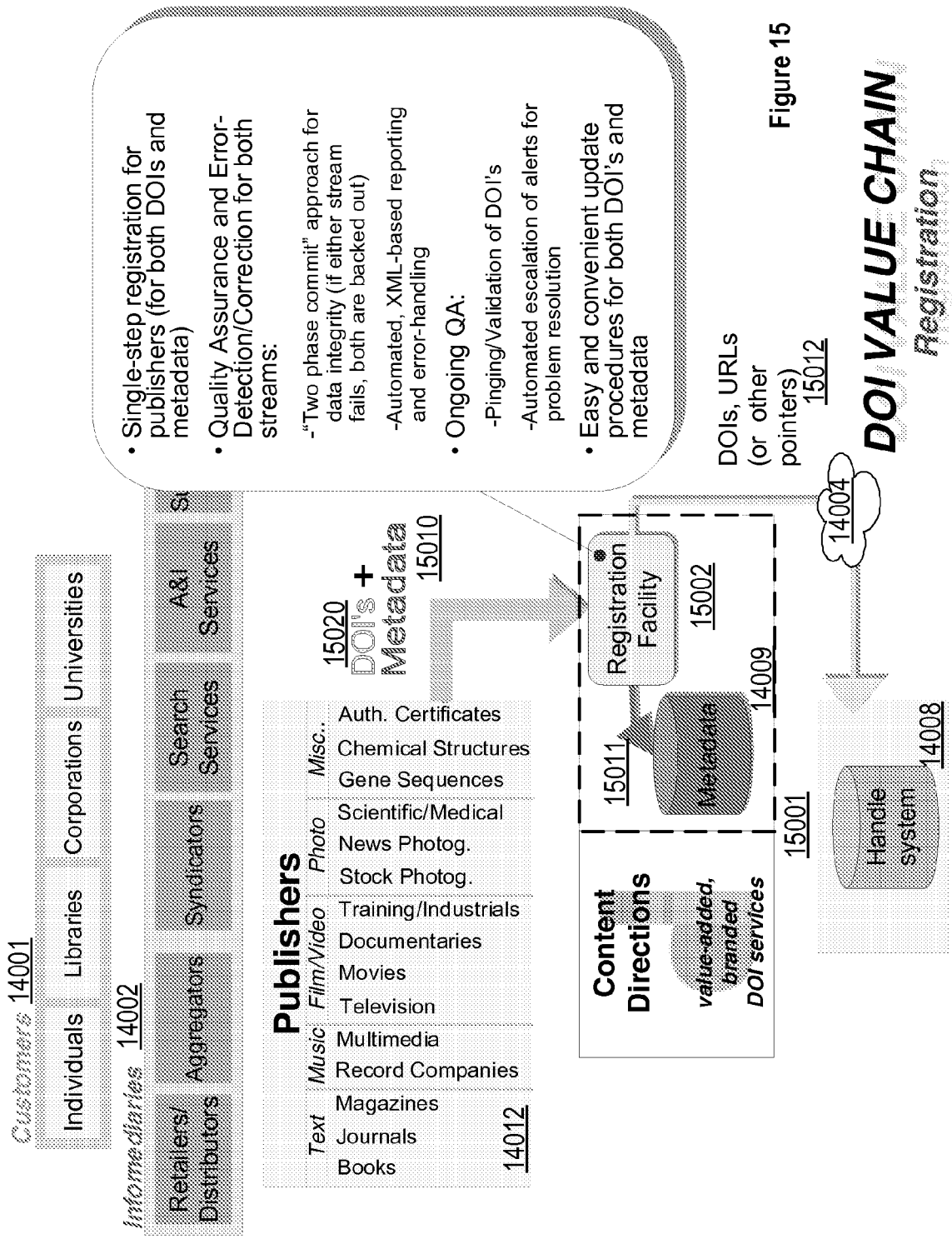
FIGS. 15 and 16 illustrate non-limiting examples of the DQAS interacting with various entities.
Figure 16:
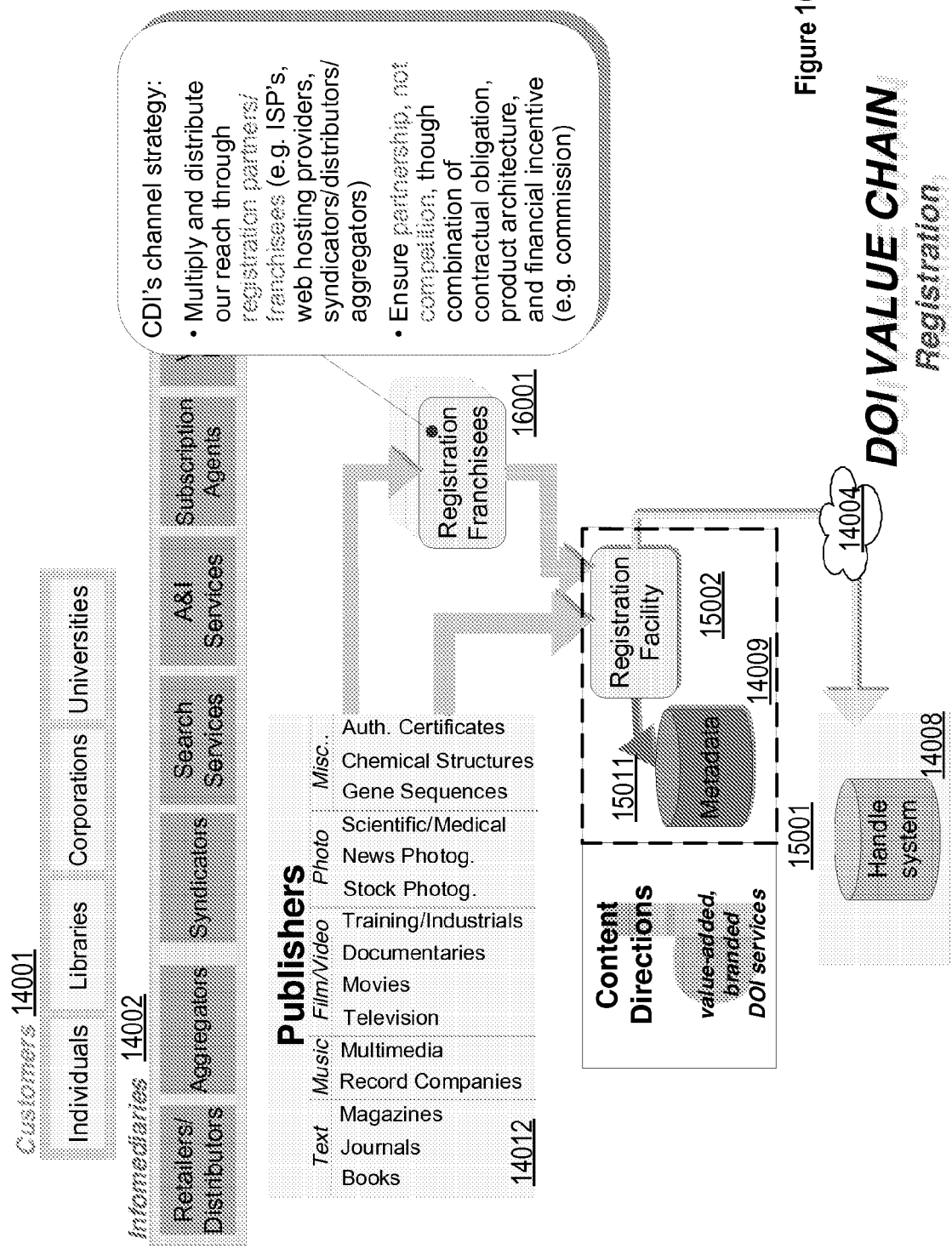

FIGS. 15 and 16 illustrate non-limiting examples of the DQAS 15001 interacting with various entities. FIGS. 15 and 16 overview the environment depicted in FIG. 14 highlighting the registration facilities 15002 of the DQAS 15001. Publishers 14012 may wish to make their information available through different locations, in different formats, in different contexts, for different purposes and uses. In so doing, publishers may register a DOI 15020 and associated metadata 15010 in an enhanced Handle system 14008 and metadata database 14009 with a registration facility 15002. In one embodiment, the metadata is separated from the DOI 15020 at the registration facility 15002 and the metadata 15011 is sent to the metadata database 14009 in a first phase of a two phase commit procedure. In the second phase, the DOIs, URLs and any other associated pointers 15012 are separated from the metadata 15010 and sent with any security authorization information (e.g., a password) to the Handle system 14008 across a communications network 14004. In an alternative embodiment, a user may request to register a DOI without metadata so that it is not made public and/or not made available for searching; in one embodiment, a registration agency may charge the user for such an "unpublished DOI." Upon successful registration of both the associated metadata 15011 in the metadata database 14009 and the DOIs 15012 in the Handle system 14008, registration will be deemed successful. If either registration step fails, the associated data in the other step or steps will be removed from the database. The registration facility will provide XML or tag-based reporting and error handling with regard to this two-phase commit procedure, which will allow registrants to automate the handling of error conditions. Furthermore, publishers may wish to ensure that their information remains available and accessible through the Handle System and request that the registration facility 15002 perform various quality assurance tests to validate that DOIs in the Handle System 14008 properly resolves to associated information.

In one embodiment, as part of the registration process, the registration facility provides publishers with a tag to be embedded into the information being registered so that it may be later verified. This tag may be a checksum, digital certificate, digital signature, DOI, encryption key, password, almost any form of security authorization, and/or the like. Any code may be embedded as a tag as long as the code, once recognized, can be used to establish the validity of the information. In one embodiment, the tag needn't be guaranteed to be unique; e.g., the tag could merely be a tag that says "<SOURCE TAG VALIDATOR>Valid Information</SOURCE TAG VALIDATOR>". Of course, using tags that are more unique reduces the likelihood that tag information is incorrectly validated. The tag itself may be of any format as specified by an information owner. Response parsers may be programmed by policies to look for custom tags. In one embodiment, XML codes are appended to information for source tag validation. Furthermore, a three phase automatic hosting and registration process (i.e., a two phase commit with the additional phase of automatically taking content from a user, hosting it, and making it available for resolution with a registered DOI and/or any associated metadata) may employ such ping validation. In such an embodiment, upon transferring content from the client to a suitable storage facility, the DQAS may validate the source and/or location address of the source by ping testing the location addresses and/or source, and/or employing various other validation techniques as described throughout the present disclosure. In such an embodiment, the DQAS would be integrated into a registration agency capable of three-phase automatic hosting and registration such as an Information Access Registration Server (LARS) Controller, and/or the like. By adding validation to the three-phase automatic hosting and registration facility, a three-phase commit becomes possible. In such an embodiment, if a validation (i.e., ping test) and/or either part of a two-phase commit fail (i.e., either the metadata and/or the DOI registration with the Handle System), then the registration of the DOI will not be complete and an error will be generated by the IARS indicating an error. Of course, just as with a two-phase commit, depending upon how a user wishes errors to be handled, three-phase commit errors may cause a complete failure of registration of the DOI(s), and/or alternatively, may still allow portions of any one of the three-phases to complete and simply alerting the user and/or registration agency of the remaining errors, which have been specified as non-critical. Such an automated three-phase commit registration process is useful for users that require guaranteed timely publication of a source.

FIG. 16 elaborates on the environment depicted in FIG. 15. FIG. 16 highlights that it is contemplated that various registration franchisees 16002 may process and accept DOI registrations from publishers 14012 and forward the registration requests to the registration facility 15002. The franchisees may be ISPs, web hosting providers, syndicators, distributors, aggregators, and/or the like. The various franchisees may extend the reach of the registration facility to obtain additional publishers, and provide financial incentives to partner with the registration facility while building upon the registration facility's infrastructure for registration (e.g., providing commissions). In one non-limiting embodiment, the registration facility will pay a commission to the franchisees (i.e., a percentage of revenue from every DOI registration brought to the registration facility by the franchisee). In such an embodiment, the franchisee accepts the registration request as a "store front," but actually passes the registration request back to a registration facility. The registration facility executes the registration and is paid directly by the registering user, and upon payment a commission is paid to the franchisee. In an alternative embodiment, the "store front" franchisees will accept payments from the registering users, and will forward payments for registration to the registration facility.

In another non-limiting example embodiment, the franchisees may license registration technology from the registration service, operating substantially independently, but with information-sharing or other agreements in place between the registration service and the franchisee. In an alternative embodiment, the franchisees are employed as outsourced facilities to conduct quality assurance as is detailed further in the disclosure.

Quality Assurance System Overview

Figure 17:
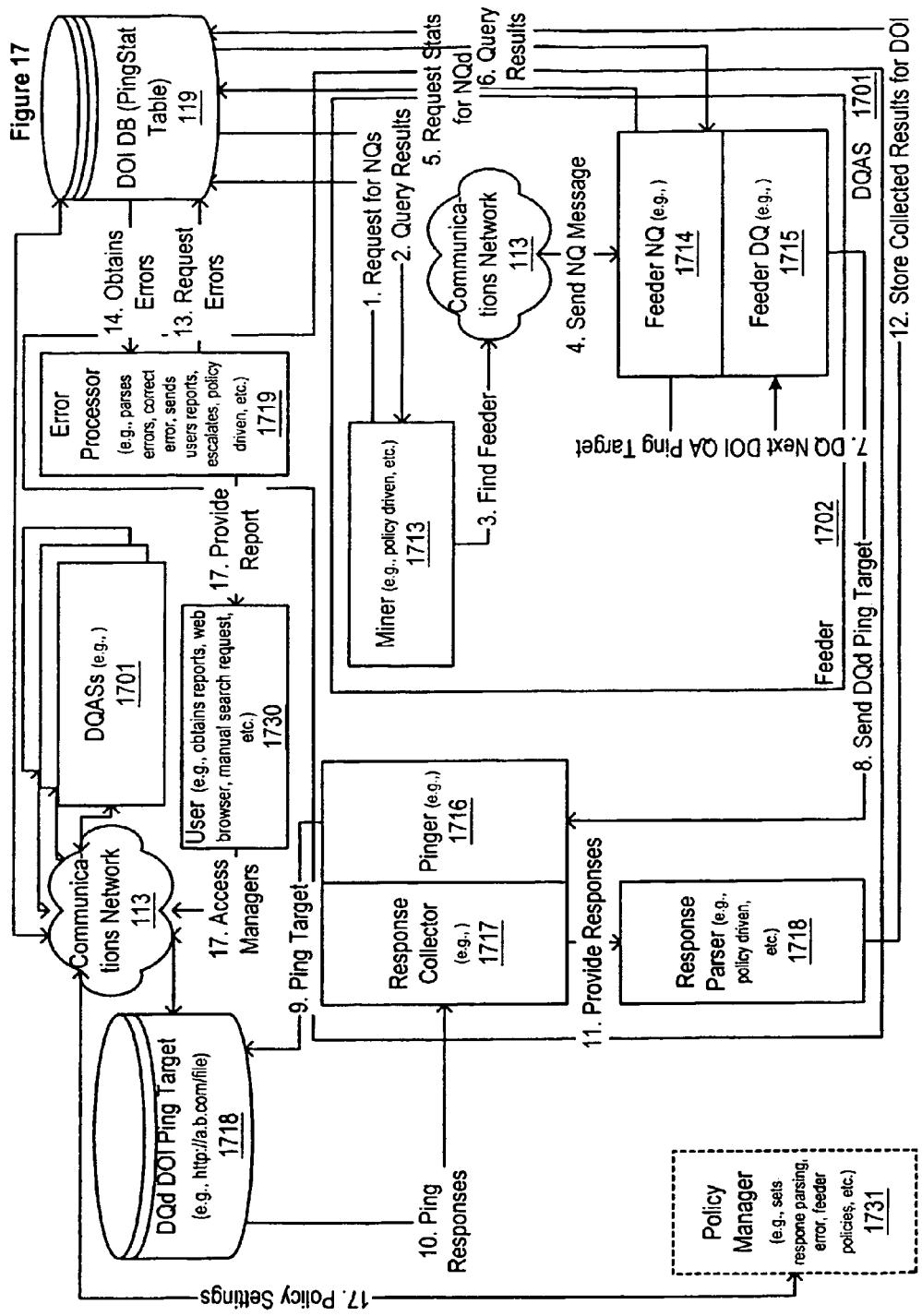
FIG. 17 illustrates a non-limiting example of the DQAS interacting with various entities in the validation of a Handle.

FIG. 17 illustrates a non-limiting example of the DQAS 1701 interacting with various entities in the validation of a Handle with the Handle System. A general overview of validating DOIs involves a DQAS 1701 pinging a target location 1718 for a target specified from a DOI database 119. Throughout the disclosure, references made to pinging will be understood to mean a request for communications where a confirmation of said communication request is expected. Pinging may be as simple as a Unix netstat, ping, spray, traceroutes, and/or the like request(s). However, pinging may also mean more complicated requests such as a request for data via HTTP, FTP, telephone calls with voice recognition, E-mail confirmation via read receipts, telephony responses, and/or the like, wherein complex data is returned and may be parsed for validation purposes. In an alternative embodiment, varying combinations of single and/or multiple simple ping requests and more complex data requests may constitute a single "ping" action, which provides a multitude of metrics regarding the availability of the ping target.

The DQAS validates that a DOI properly resolves to a location containing information that is represented by the DOI. For example, if DOI "10.123/abcdefg" represents the information "Moby Dick," which should be found at location "a.b.com/file", then when the DQAS 1701 determines to validate the DOI "10.123/abcdefg" from the DOI database 119, the DQAS will examine the location "a.b.com/file" and ensure that the location is available. In an alternative embodiment, the DQAS may also ensure that the location actually contains the associated information "Moby Dick."

In one non-limiting example validation, a user 1730 may engage the DQAS 1701 by submitting and/or establishing a policy to validate a DOI via a communications network 113. The user may do so by employing a policy manager tool 1731 as will be detailed further in the disclosure in FIG. 25 and throughout. The policy manager may set and/or affect policies throughout various DQAS components such as a response parser, 1718, feeder 1702, miner 1713, error processor, and/or the like. Typically, a policy may be established after a DOI has been registered. In an alternative embodiment, the policy manager tool is invoked from within a registration tool. The policy manager tool may be embodied as a web page or a client application and provide for the validation of DOIs singly and/or in batches. Upon providing the policy manager tool with the proper entries, the policy manager tool may provide the DQAS (e.g., a registration agency) with a DOI validation policy for specified DOIs by way of communications network 113. Alternatively, a receiving DQAS 1701 may process the DOIs from a DOI database 119 in an automated fashion established by a registration agency's policy. Regardless of how policies are established, whether by user 1730, policy manager 1731, and/or by a registration agency, a DQAS 1701 will engage in validating DOIs from a registration agency's database 119.

In one non-limiting example embodiment, a DQAS 1701 comprises a feeder 1702, a pinger 1716, a response collector 1717, a response parser 1718, and an error processor 1719. The feeder is further comprised of a miner 1713, an enqueue (NQ) feeder 1714, and a dequeue (DQ) feeder 1715. Of course all of the above components may be combined and/or distributed in various manners as was already discussed in FIG. 1. In one embodiment, the NQ and DQ feeders are separate modules from the miner 1713 and disposed in communication by way of a communications network 113 to facilitate scalability. Although not pictured for sake of clarity, all communications between components in FIG. 17 and others in this disclosure, may be either through direct connections and/or through a communications network 113; a preferable embodiment will depend upon deployment conditions.

Initially, the miner 1713 makes a request for DOIs to enqueue from the DOI database 119. The DOI database may be maintained by a registration agency, the Handle System, a mirror, and/or the like. Upon processing the query request from the miner 1712, the DOI database 119 provides the query results back to the miner 1713. In an alternative embodiment, the miner receives its apportionment of DOIs from a source database other than the Global Handle System, and then the miner compares the records it has received from the alternative source with those present in the Global Handle System for the same DOIs to ensure that it is verifying the records as they appear to public users of DOI system. Next, the miner may find an available NQ feeder to feed the returned query results 1714, which are locations of information for various resolutions of various DOIs. The NQ feeder maintains a queue in which it orders DOI resolutions that are to be validated by the DQAS (i.e., a list for received NQ messages from the miner). This queue is discussed in greater detail in FIG. 18. The NQ feeder then may request statistics regarding DOIs (or various resolutions thereof) that have been enqueued from the DOI database 119. In one embodiment, such statistics may be maintained in a ping statistics table 119. The requested query results are supplied back to the NQ feeder 1714 from the DOI database 119. In an alternative embodiment, these statistics may be obtained by the miner 1713 together with the initial request for DOIs to enqueue. The DOI ping statistics may include error rates, times of successful pings, time of failed pings, ranks, and/or the like with regard to any previous quality assurance validations performed for any given DOI, or any particular resolution thereof. The DOI ping statistics may be used for arranging, ordering, and/or otherwise ranking enqueued DOI resolutions in the feeder 1702. Such ordered DOI resolutions in turn may be fed to pingers 1716.

As the NQ feeder 1714 arranges NQ messages (i.e., DOI resolutions to enqueue for purposes of validation) from the miner and ping statistics for the DOIs from the DOI database in its queue, the DQ feeder 1715 dequeues ordered NQ messages from the queue. The DQ feeder provides dequeued ping targets to the pinger 1716. When the pinger 1716 obtains DQd messages (i.e., messages dequeued from the queue), the pinger pings the target of the DQd message 1718. In an alternative embodiment, the pinger is passed not particular resolutions of a given DOI, but the DOI itself, and attempts to resolve all locations associated with the DOI as enqueued from a DOI database 119 by a miner. In another alternative embodiment, the pinger attempts to resolve all locations associated with a DOI as stored in the Handle System and enqueued by miner. If the ping target 1718 sends back responses, the ping responses will be obtained by a response collector 1717. A response parser 1718 then obtains the collected responses from the response collector 1717 and stores the collected ping responses in the DOI database in a ping statistics table 119. The parsed ping responses stored in the ping statistics table 119 may contain ping times, latency values, error messages, and/or the like.

As the DOI database and/or ping statistics table 119 collects statistics and errors associated with DOIs that have been pinged for validity, an error processor 1719 may make requests for ping response errors from the DOI database 119. As the error processor 1719 obtains query results from the DOI database detailing the ping errors, the error processor may parse the errors, correct the errors, send users reports of the errors, and/or escalate error reports to differing contacts by differing mediums. The error processor will parse, correct, report, and escalate errors based on a policy established and/or governing for any particular DOI. Any reports and/or escalations by the error processor may in turn be provided to the user 1730. The user may passively obtain such reports by way of automated phone calls, E-mail, beeper, and/or the like. In another embodiment, the user may also actively query for error reports by way of access managers that allow the user to search for errors by way of web page via a policy manager and/or the like facility.

Feeder Overview

Figure 18:
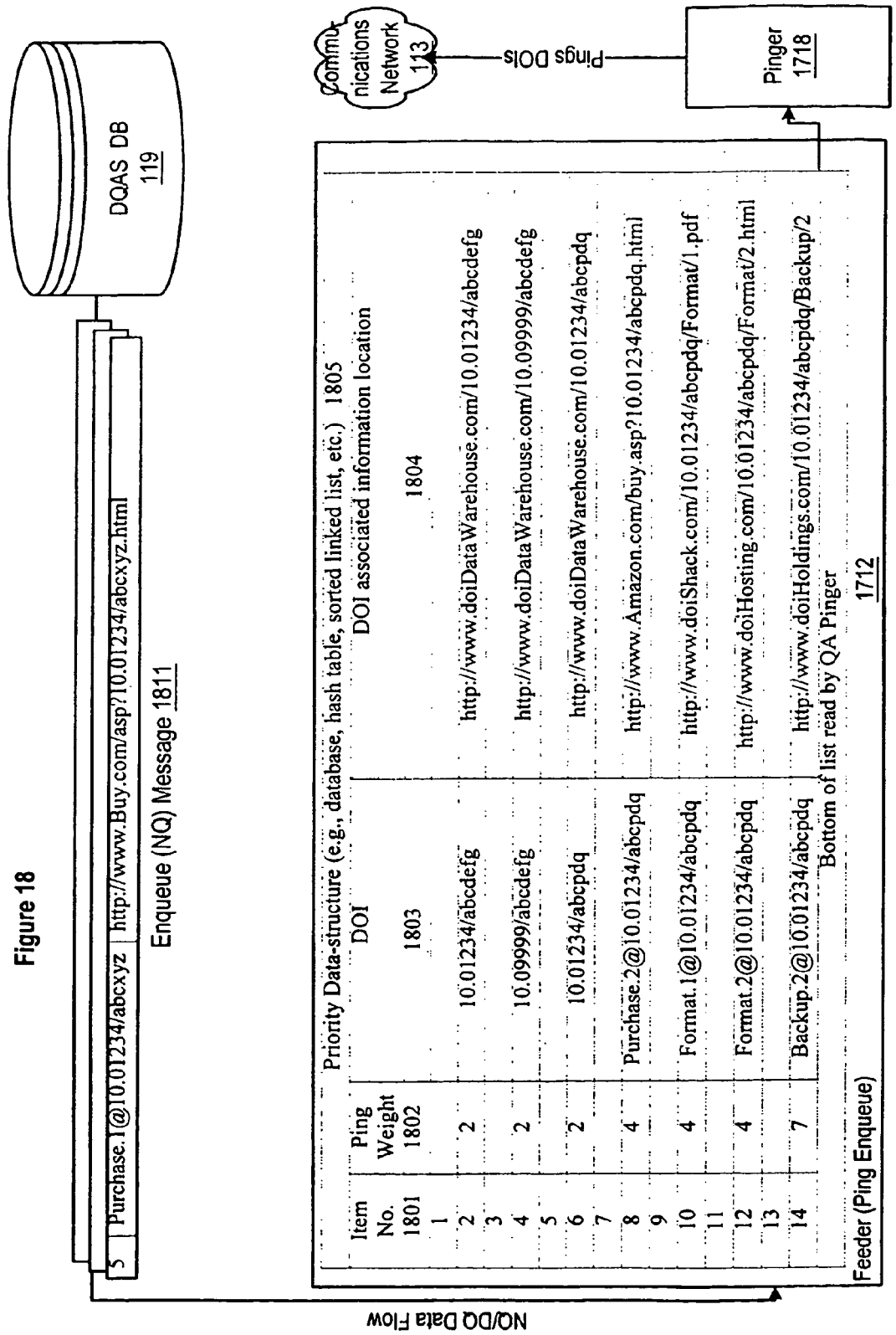
FIG. 18 illustrates a non-limiting example overview of a feeder and data flow.

FIG. 18 illustrates a non-limiting example overview of a feeder and data flow. A feeder 1712 maintains a priority data structure 1805. The priority data structure may be in the form of a database, hash table, queue, sorted (double) linked list, and/or the like (hereinafter "queue"). The queue may be ordered 1801, and contain ping weights 1802 for each DOI entry 1803 and any DOI associated information location 1804. Each DOI 1803 item 1801 may obtain its ping weight 1802 and/or rank from a composite computed from ping statistics maintained in a DQAS database 119 as will be detailed further in FIG. 19. In an alternative embodiment, the queue may be expanded to have more columns and contain actual ping statistics by which the queue is ranked. In this example queue 1805, DOIs with the highest ping weights are ordered down towards the bottom of the queue. In one embodiment, a higher ping weight evinces a higher priority. In such an embodiment, higher priority potential ping events are expedited by the feeder to a pinger for ping testing. In this non-limiting example, the bottom of the queue is where the higher weighted DOIs are to be dequeued from and supplied to a pinger 1718. NQ messages 1811 are provided to the feeder by a miner (not pictured) from a DQAS database 119. In the example illustrated in the figure, an NQ request 1811 has a ping weight of "5" and will be inserted as item 13 in the queue 1805 towards the bottom of the queue. The pinger employs the DQ messages to ping locations across a communications network 113 where DOI associated information is to be found.

Quality Assurance Feeder

UNI Data Miner

Figure 19:
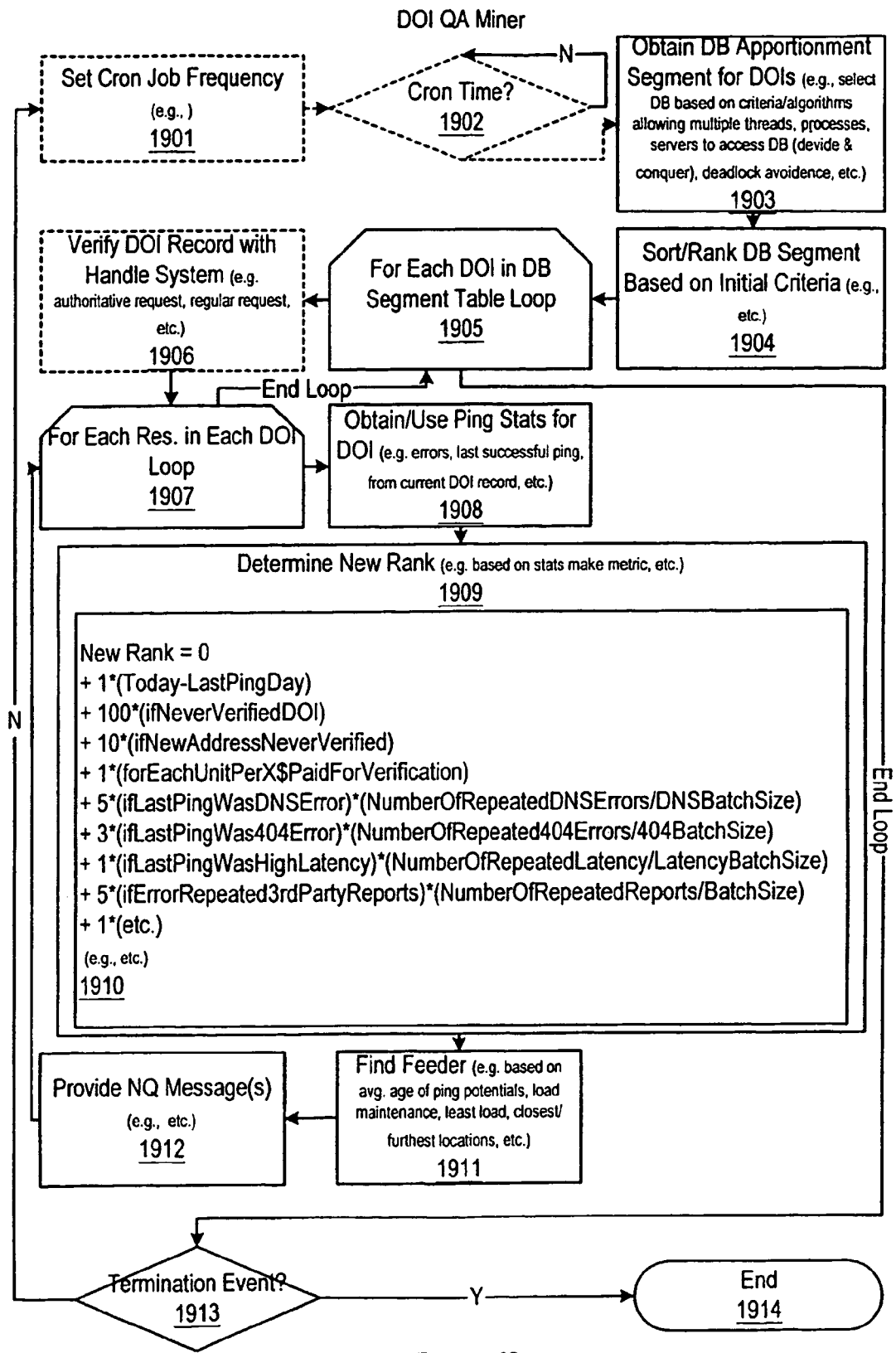
FIG. 19 illustrates one non-limiting example flow diagram of a quality assurance UNI data miner facility (miner)

FIG. 19 illustrates one non-limiting example flow diagram of a quality assurance UNI data miner facility (miner). Optionally, the miner may be run at various intervals as set through a cron job at specified periodic intervals 1901. If the miner runs at specified times, the DQAS will determine if the miner's time to run has transpired 1902. If not, the DQAS will keep checking until the specified time has arrived 1902. Alternatively, the miner may run continuously or for only single iterations.

Also, the miner may be executed on demand, e.g., from a user and/or system request. For example, a user that has a need to immediately test a site (e.g., perhaps they have just established an Internet Web Presence and wish to quality test the availability of their content before the public is allowed access), such a user may make a priority request that will be provided to the miner to obtain and test the quality of DOI resolution for the user's content. Furthermore, this on demand execution may be triggered by various events which are monitored by the DQAS. In such an embodiment, certain criteria may be monitored by the DQAS as established in a policy. Criteria may include specified publishers, DOIs, particular types problems, and/or the like. For example, a triggering event may be when any DOIs of a particular publisher prefix are encountered, a miner will engage in quality assurance testing. In another non-limiting example embodiment, a triggering event may be one where a particular range of DOIs, whenever encountered by a miner, are ignored and not enqueued for quality assurance testing. In yet another embodiment, a triggering event may be one where a particular error (e.g., whenever 3 consecutive latency errors are detected for any DOI regardless of individual policy) causes the miner to enqueue a feeder. In essence, the miner may have its own triggering policies. In one such embodiment, triggering policies may be separate and overarching policies beyond any individual policies generated by and/or for individual publishers and/or publisher DOIs. In another embodiment, the miner may have triggering policies for individual publishers and/or publisher DOIs. In yet another embodiment, the miner may maintain triggering polices that both overarch individual policies, and support individual policies even in combination with each other. Furthermore, all policies may be dynamically updated.

Upon being instantiated into existence, the miner obtains an apportionment segment for DOIs from a DQAS database 1903. In other words, the miner obtains some portion of DOIs requiring validation from a DOI table in a DQAS database 119. The portion may be established by policies by the DQAS, and/or the miner. The miner creates a query request for the DQAS database. As there may be multiple instances of miners making requests of the DQAS, a central DQAS may manage miners so as to avoid repeated requests of the same DOIs, deadlocks, and/or the like. In such an embodiment, multiple threads, processes, and servers may all be accessing the DQAS database simultaneously to divide up a potentially large number of DOIs that require validation by the DQAS. In an alternative embodiment, a single DQAS manages all validation of DOIS. In one embodiment, the miner requests the DOI identifier, associated resolution location(s), information tag identifier, and/or the like. In another embodiment, ping statistics are also requested. The query request may also supply an initial sort for the database query results based on initial criteria 1904. In one embodiment, the previous computed validation rank is used to sort the query results so that the highest ranked results are validated first.

Upon obtaining the sorted query results from the DQAS database 1904, the miner iterates for each DOI in the returned query results for the database segment 1905. For each DOI in the returned results 1905, the miner optionally may verify the DOI record with the Handle System 1906. The miner may make an authoritative request and/or a regular request of the Handle System. In an alternative embodiment, this additional verification may be done by the pinger and the results stored in the DQAS database for later mining. Upon iterating for each DOI in the selected database segment 1905, the miner iterates for each resolution for each DOI 1907. For example, where an enhanced DOI has two formats (e.g., Format.1@10.123/abcdef; Format.2@10.123/abcdef), each format will have a resolution location associated with it (e.g., for format 1, www.location.com/spot1; for format 2, www.location2.com/spot2) 1907. Thus for each such resolution location 1907, the miner will obtain ping statistics for that DOI resolution 1908. In an alternative embodiment, the miner obtains ping statistics with the original query to the DQAS 1903. The ping statistics may include information such as errors pinging the DOI resolution-location, the time/date of the last successful ping to the DOI resolution location, number of repeated errors for the DOI resolution location, if the DOI resolution location has ever been validated, composited rank, and/or the like.

Using the ping statistics 1908, the miner determines a new rank for the DOI resolution location 1909. In one non-limiting example embodiment, the new rank (i.e., ping weight) is based on weighted error and ping statistics 1910. For example:

---

New Rank =
+ 1*(Today-LastPingDay)
  {The above line provides one rank point for each day the DOI resolution location has not been validated}
+ 100*(ifNeverVerifiedDOI)
  {The above line provides one hundred rank points if the DOI has never been validated}
+ 10*(ifNewAddressNeverVerified)
  {The above line provides 10 rank points if the DOI resolution location has never been validated}
+ 1*(forEachUnitPerX$PaidForVerification)
  {The above line provides 1 rank point for each purchased rank point. This is an example where a DQAS operator may charge a specified amount of money for each additional unit of rank priority.}
+
5*(ifLastPingWasDNSError)*(NumberOfRepeatedDNSErrors/DNSBatchSize)
  {The above line provides 5 rank points for each repeated batch of DNS errors. A DNS batch size may be specified. A batch size is a specified number of occurrences to have transpired for the system to take notice so that additional rank points will be awarded. If the last ping resulted in an error, the number of repeated DNS errors divided by the batch size will result in multiplier for the 5 rank points.}
+ 3*(ifLastPingWas404Error)*(NumberOfRepeated404Errors/404BatchSize)
  {The above line provides 3 rank points for each repeated batch of HTTP 404 errors. A 404 batch size may be specified. If the last ping resulted in an error, the number of repeated 404 errors divided by the batch size will result in multiplier for the 3 rank points.}
+
1*(ifLastPingWasHighLatency)*(NumberOfRepeatedLatency/LatencyBatchSize)
  {The above line provides 1 rank point for each repeated batch of latency errors. A latency batch size may be specified. If the last ping resulted in an error, the number of repeated latency errors divided by the batch size will result in multiplier for the 1 rank points.}
+ 5*(ifErrorRepeated3rdPartyReports)*(NumberOfRepeatedReports/BatchSize)
  {The above line provides 5 rank point for each repeated batch of 3$^{rd}$ party reported errors. A 3$^{rd}$ party reported batch size may be specified. If the last ping resulted in an error, the number of repeated 3$^{rd}$ party reported errors divided by the batch size will result in multiplier for the 5 rank points.}

---

The summation of the above will be set equal to the new composited rank. Of course, this is only one ranking scheme, and countless others may be employed and/or established by way of a policy.

Upon determining a new rank 1909, the miner locates feeders 1911. Feeders may be identified on many criteria such as locating feeders: with the lightest system loads, with the lowest average age of ping potentials, that are closest to the DOI resolution location, that are furthest from the DOI resolution location, and/or the like. "Ping potentials" are DOI resolution locations enqueued in feeders. A potential ping is one that is enqueued and has not yet been dequeued to a pinger. Such ping potential statistics are maintained by the feeders in a database, log, and/or like data structure. In one embodiment, the feeders send their current ping potential statistics to miners so that such load balancing decisions may be made by the miners. Upon identifying an appropriate and/or available feeder, the miner provides NQ message(s) to the identified feeder 1912. Upon enqueuing a DOI resolution location for validation (i.e., pinging) 1912, the miner will iterate the next resolution for the current DOI 1907.

When all the multiple resolutions for the current DOI have been iterated 1907, the loop ends and the next DOI in the database segment returned by the DQAS database will be iterated 1905. When all DOIs from the returned database segment have been iterated 1905, the miner will determine if a termination event has occurred 1913. If not, the miner will wait for the next cron iteration 1901, 1902, and/or continue executing 1903 until a termination event 1913 has been detected at which point execution shall cease 1914.

Enqueue Feeder

Figure 20:
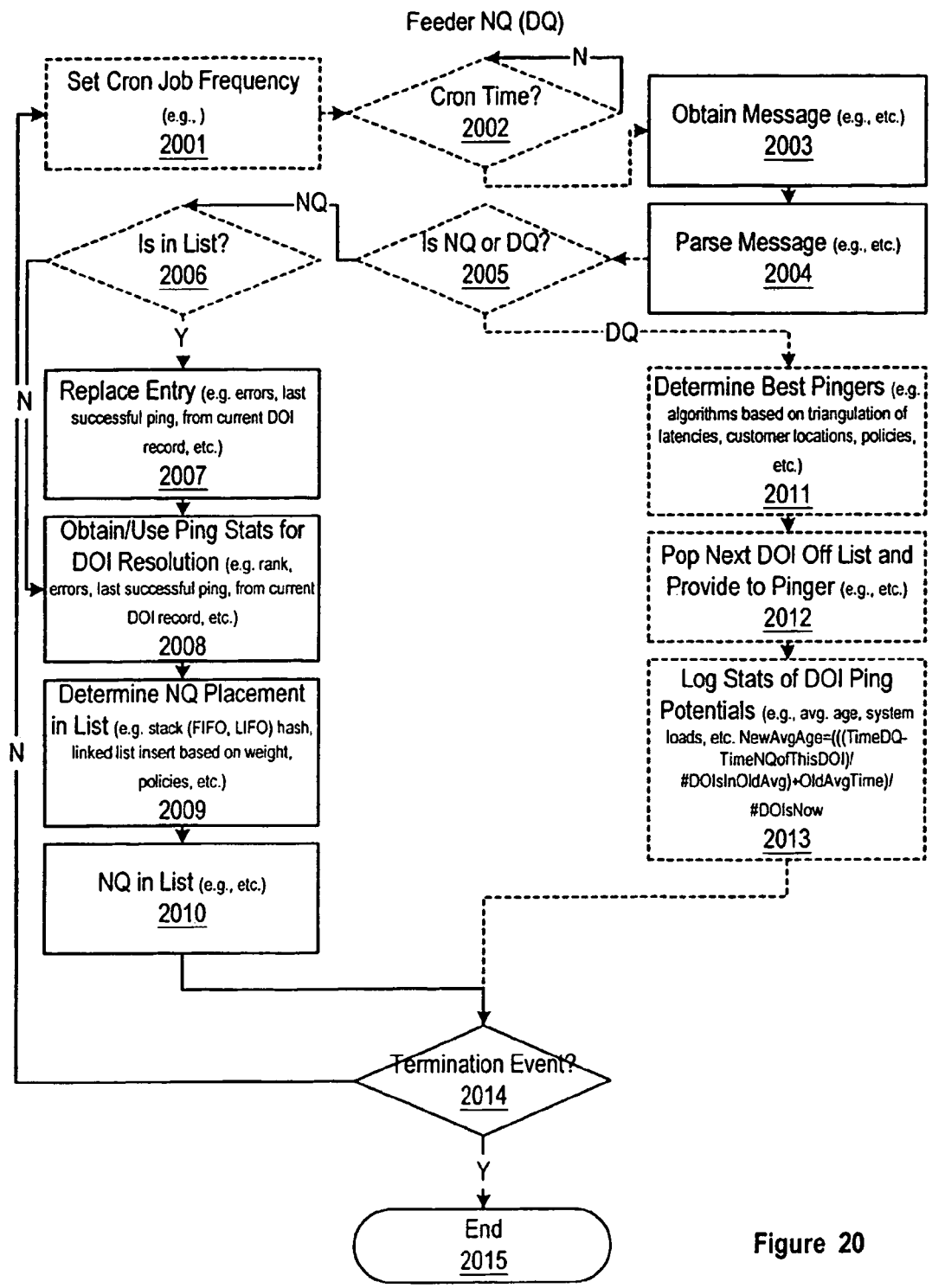
FIG. 20 illustrates one non-limiting example flow diagram of a quality assurance enqueue feeder (NQ feeder)

FIG. 20 illustrates one non-limiting example flow diagram of a quality assurance enqueue feeder (NQ feeder). Optionally, the NQ feeder may be run at various intervals as set through a cron job at specified periodic intervals 2001. If the NQ feeder runs at specified times, the DQAS will determine if the NQ feeder's time to run has transpired 2002. If not, the DQAS will keep checking until the specified time has arrived 2002. Alternatively, the NQ feeder may run continuously or for only single iterations. Also, the NQ feeder may be executed on demand, e.g., from a user and/or system request.

Upon being instantiated into existence, the NQ feeder obtains a message 2003. Typically this message is an NQ message from the miner as discussed above in FIG. 19 and throughout. However, in an alternative embodiment, a DQ message may be obtained from a pinger 2003. Upon obtaining a message, the message is parsed 2004. The message is parsed into various fields (e.g., type: enqueue request from miner, dequeue request from pinger, and/or the like; entry: a DOI, an associated location, metadata, and/or the like; enqueue DOI statistics: ping statistics, rank, and/or the like; removal: pinger address, and/or the like; and/or the like. Upon parsing the message 2004, the NQ feeder optionally determines if the message is an NQ or DQ message 2005. This may be accomplished by simply parsing out a type field stating if the message type an enqueue or dequeue request.

If a DQ message is detected 2005, the NQ feeder optionally may determine the best pinger available 2011. Even though a particular pinger may be requesting a DQ event 2005, the feeder may still determine that a more appropriate pinger exists that is preferable to the requesting pinger. In one example, a policy established by the DOI owner may require that only a specified pinger is to validate the DOI. Alternative embodiments may include algorithms based on triangulation of pinger latencies, customer locations, and/or the like considerations. Upon determining the best pinger, and/or simply identifying the requesting pinger 2011, the NQ feeder will dequeue the next DOI resolution location converting it from a potential ping into an actual ping request 2012. Upon having the ping request provided to the determined pinger, ping potential statistics are logged 2013. In one non-limiting example embodiment, the ping potential statistics logged are based on average age of potential pings, system loads, and/or the like 2013. For example:

```
NewAvgAge =
(
  (
    (
      (TimeDQ-TimeNQofThisDOI)/#DOIsInOldAvg
        {The above line divides the amount of time the next item to
        be dequeued from the NQ feeder has remained a potential
        ping candidate by the number of potential pings (i.e.,
        unpinged DOI location resolutions) that were used to make
        the previous average potential ping age for the NQ feeder}
    )
    + OldAvgTime
        {The above line adds previous average potential ping age for
        the NQ feeder to the previous line's results}
  )/#DOIsNow
        {The above line divides the new number of potential pings
        remaining in the NQ feeder into the previous line's results}
)
```

The result of the above computation is the new average age of all ping potentials on a particular NQ feeder. Of course, this is only one feeder statistic, and countless others may be employed and/or established by way of a policy. Other statistics include system loads, connection bandwidth, available memory, and/or the like. Such feeder statistics may be logged, and provided to miners on request so that miners may determine which pingers are to be used 2013 as has been discussed in FIG. 19 and throughout. Alternatively, the feeders may use log statistics, and/or queue length to aid in determining to make requests of miners for more or fewer NQ messages.

If an NQ message is detected 2005, the NQ feeder optionally may determine if the new entry for the queue is already in the list 2006. In other words, if a DOI resolution location is already enqueued in the NQ feeder's queue 2006, then the old entry in the queue is replaced whereby the new entry has the latest associated errors, an updated last successful ping value, etc. from the current DOI record in the DQAS database 2007. However, if the NQ request is not already in the list, and/or the duplicate entry has been replaced 2007, then the NQ feeder will obtain ping statistics for that DOI resolution 2008. In an alternative embodiment, the NQ feeder obtained ping statistics with the original query to the DQAS 2003. Upon obtaining the ping statistics 2008, the NQ feeder determines the NQ request's placement in the queue 2009. In one embodiment, the queue takes the form of a stack and First In First Out (FIFO) data flow is employed. In an alternative embodiment, the queue takes the form of a stack and First In Last Out (FILO) data flow is employed. In an alternative embodiment, the queue takes the form of a hash table, linked list, and/or queue and weighted ranks determine the order in which items are enqueued and dequeued. In one example embodiment, larger weights are sorted down towards the bottom of the queue and items are dequeued from the bottom of the queue as illustrated in FIG. 18. Upon determining placement of the NQ request 2009, the NQ feeder inserts the NQ request into the queue into the determined location 2010. Upon enqueuing 2010 and/or logging ping potentials 2013, the NQ feeder determines if a termination event has occurred 2014. If not, the NQ feeder waits for the next cron iteration 2001, 2002, and/or continue executing 2003 until a termination event 2014 has been detected at which point execution shall cease 2015.

Dequeue Feeder

Figure 21:
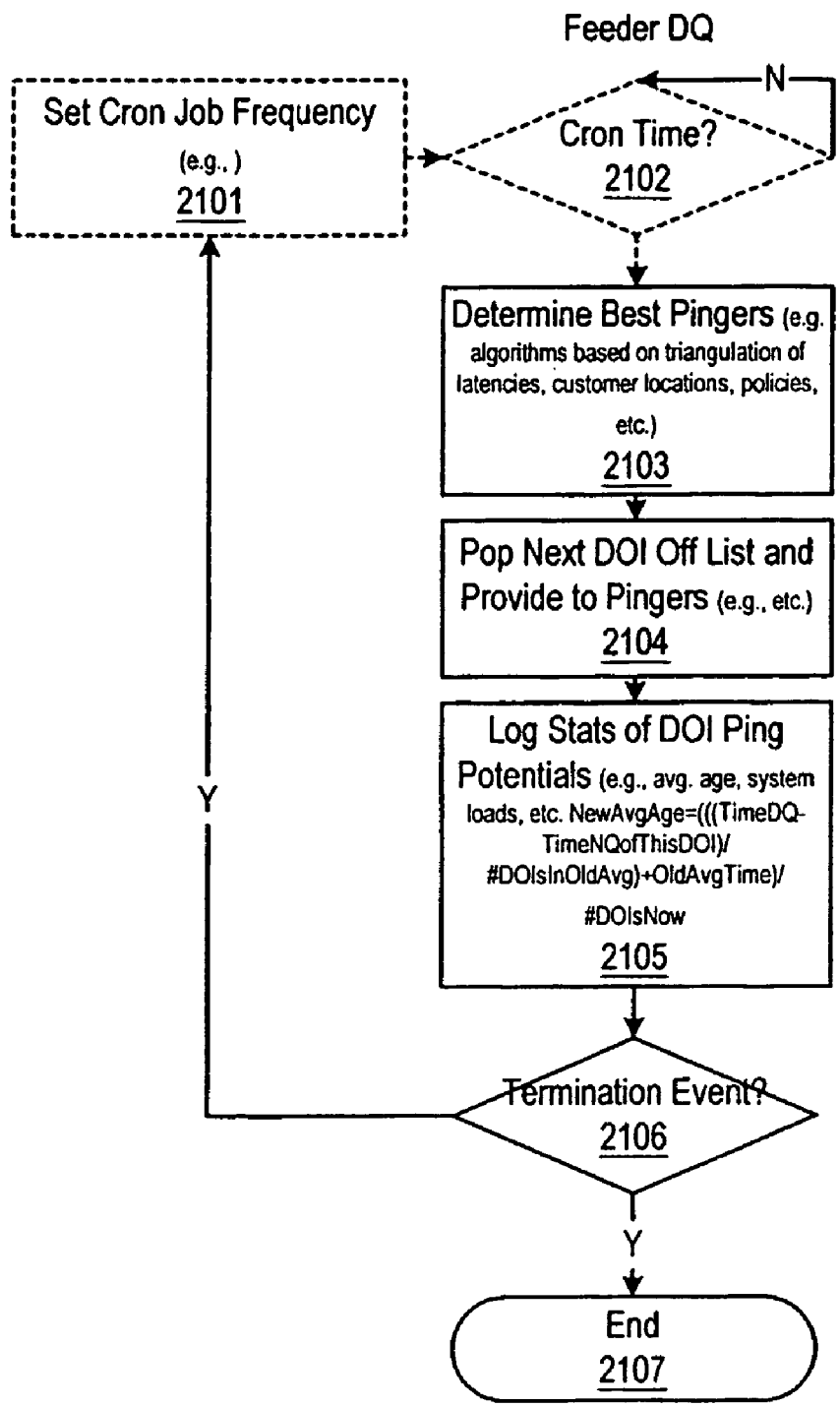
FIG. 21 illustrates one non-limiting example flow diagram of a quality assurance dequeue feeder (DQ feeder)

FIG. 21 illustrates one non-limiting example flow diagram of a quality assurance dequeue feeder (DQ feeder). Optionally, the DQ feeder may be run at various intervals as set through a cron job at specified periodic intervals 2101. If the DQ feeder runs at specified times, the DQAS will determine if the DQ feeder's time to run has transpired 2102. If not, the DQAS will keep checking until the specified time has arrived 2102. Alternatively, the DQ feeder may run continuously or for only single iterations. Also, the DQ feeder may be executed on demand, e.g., from a user and/or system request.

Upon being instantiated into existence, the DQ feeder determines the best pinger available 2103 similarly to NQ feeder determination 2011 of FIG. 20. Upon determining the best pinger, and/or simply identifying the requesting pinger 2103, the DQ feeder will dequeue the next DOI resolution location converting it from a potential ping into an actual ping request 2104. Upon having the ping request provided to the determined pinger 2104, ping potential statistics are logged 2105 similarly to NQ feeder determination 2013 of FIG. 20. Upon logging ping potentials 2105, the DQ feeder determines if a termination event has occurred 2106. If not, the DQ feeder waits for the next cron iteration 2101, 2102, and/or continues executing 2103 until a termination event 2106 has been detected at which point execution shall cease 2107.

Pinger & Responder

Pinger

Figure 22:
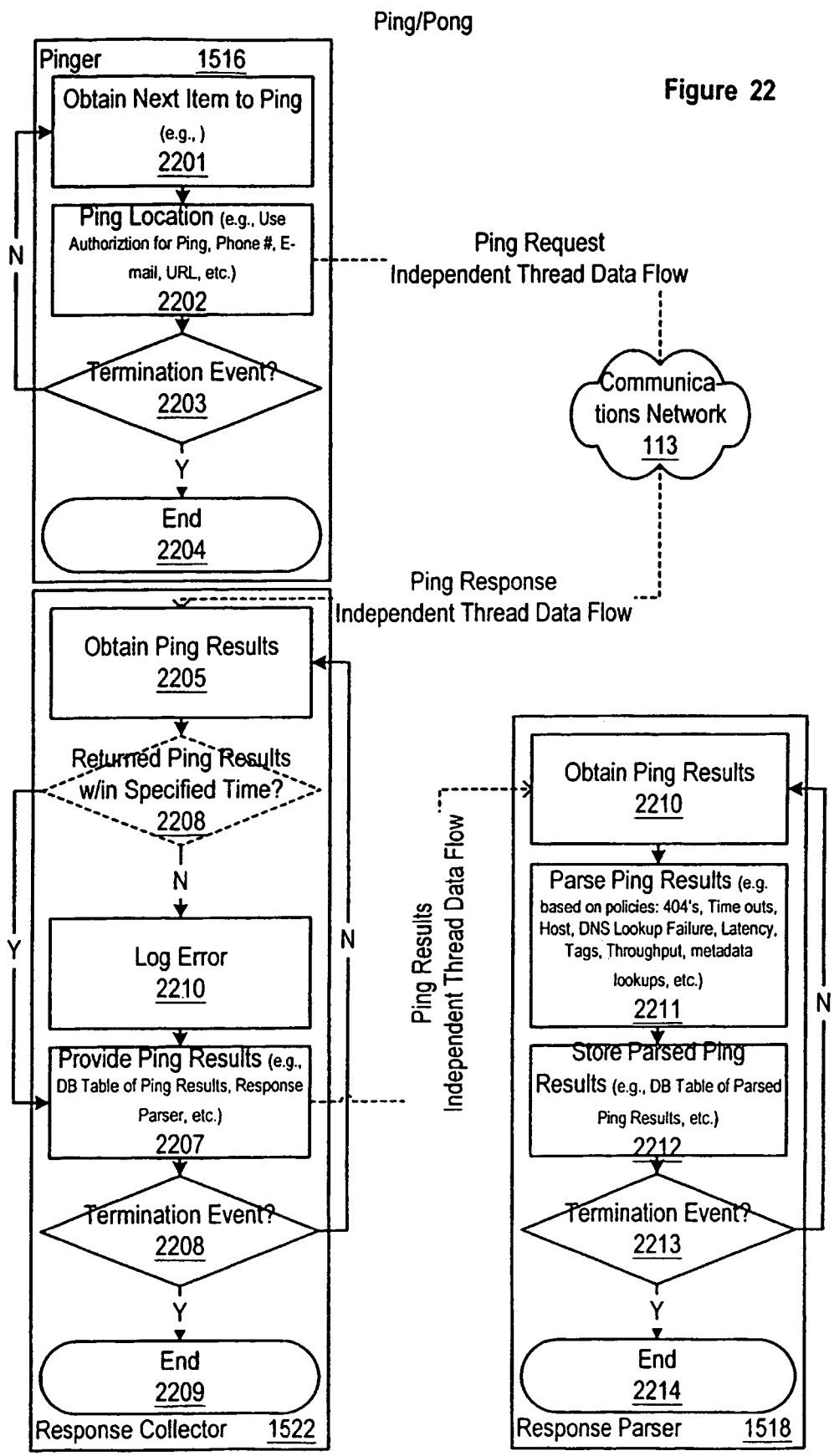
FIG. 22 illustrates one non-limiting example flow diagram of a directory quality assurance pinger facility (pinger)

FIG. 22 illustrates one non-limiting example flow diagram of a directory quality assurance pinger facility (pinger). The pinger 1716 initially obtains a next item to ping 2201. The pinger may obtain the next ping item from a feeder as described above in FIGS. 20 and 21 and throughout. In an alternative embodiment, the pinger may request items to ping from a feeder upon determining that it is available for additional pinging employing a load statistic log similar to that used between miners and feeders. The pinger may maintain received ping items 2201 in a cache, queue, and/or the like. Upon obtaining the next ping item 2201, the location is pinged 2202. In an alternative embodiment, the pinger obtains ping items with passwords, digital certificates, encryption keys, and/or the like security authorization to enable a successful ping of information at what would be an otherwise inaccessible location. Such security authorization may be provided by way of a policy manager tool as will be described in greater detail in FIG. 25 and throughout. Ping requests may be initiated over a communications network 113 as asynchronous and/or independent data flow threads to their targets and responses flow back to response collectors 1722. Upon pinging a location 2202, the pinger determines if a termination event has occurred 2203. If not, the pinger continues executing 2201 until a termination event 2203 has been detected at which point execution shall cease 2204.

Response Collector

As pingers 1716 ping locations 2202, response collectors 1722 initially obtain ping responses 2205. The response collector may maintain received ping results 2205 in a cache, queue, and/or the like. Upon obtaining the ping responses 2205, optionally the response collector may determine if the ping results were obtained within a specified time 2208. This determination may be accomplished by the pinger and response collector sharing information as discussed in FIG. 1 regarding the Distributed DQAS (e.g., intra-application communication, inter-application communication, and/or the like). In one embodiment, the pinger maintains a chronological list of all pinged items, which is used by the response collector to check that all pinged items have received ping responses 2205 within a specified time 2208. If no ping responses have been obtained for certain pinged locations 2208, then an error is logged 2210. Otherwise, the returned ping responses (and in lieu of the responses, error log entries) are provided 2207 to a response parser 1718. Alternatively, ping responses may be provided directly to a raw ping results database table in the DQAS database 119; in such an embodiment, the response parser would continuously mine the DQAS database parsing raw ping responses into appropriate fields such as ping latency, error codes, information tags, and/or the like. Ping results may be provided over a communications network as asynchronous and/or independent data flow threads to a response parser 1518. Upon providing ping and/or error results for parsing 2207, the response collector determines if a termination event has occurred 2208. If not, the response collector continues executing 2205 until a termination event 2208 has been detected at which point execution shall cease 2209.

Response Parser

As response collectors 1722 provide ping results 2207, response parsers 1718 initially obtain ping results 2210. The response parser may maintain received ping results 2210 in a cache, queue, and/or the like. Upon obtaining the ping results 2210, the response parser parses the ping results 2211. The response parser parses the raw ping results into appropriate fields such as: errors: DNS lookup, host, HTTP 404's, latency, time outs, and/or the like; information tags (for information with embedded tags validating an association between the DOI and the information), and/or the like); and/or the like 2211. Upon parsing the ping results 2211, the parsed ping results are stored 2212 in a ping statistics database table in the DQAS database 119. Upon storing the parsed ping results 2212, the response parser determines if a termination event has occurred 2213. If not, the response parser continues executing 2210 until a termination event 2213 has been detected at which point execution shall cease 2214.

Error Processor

Figure 23:
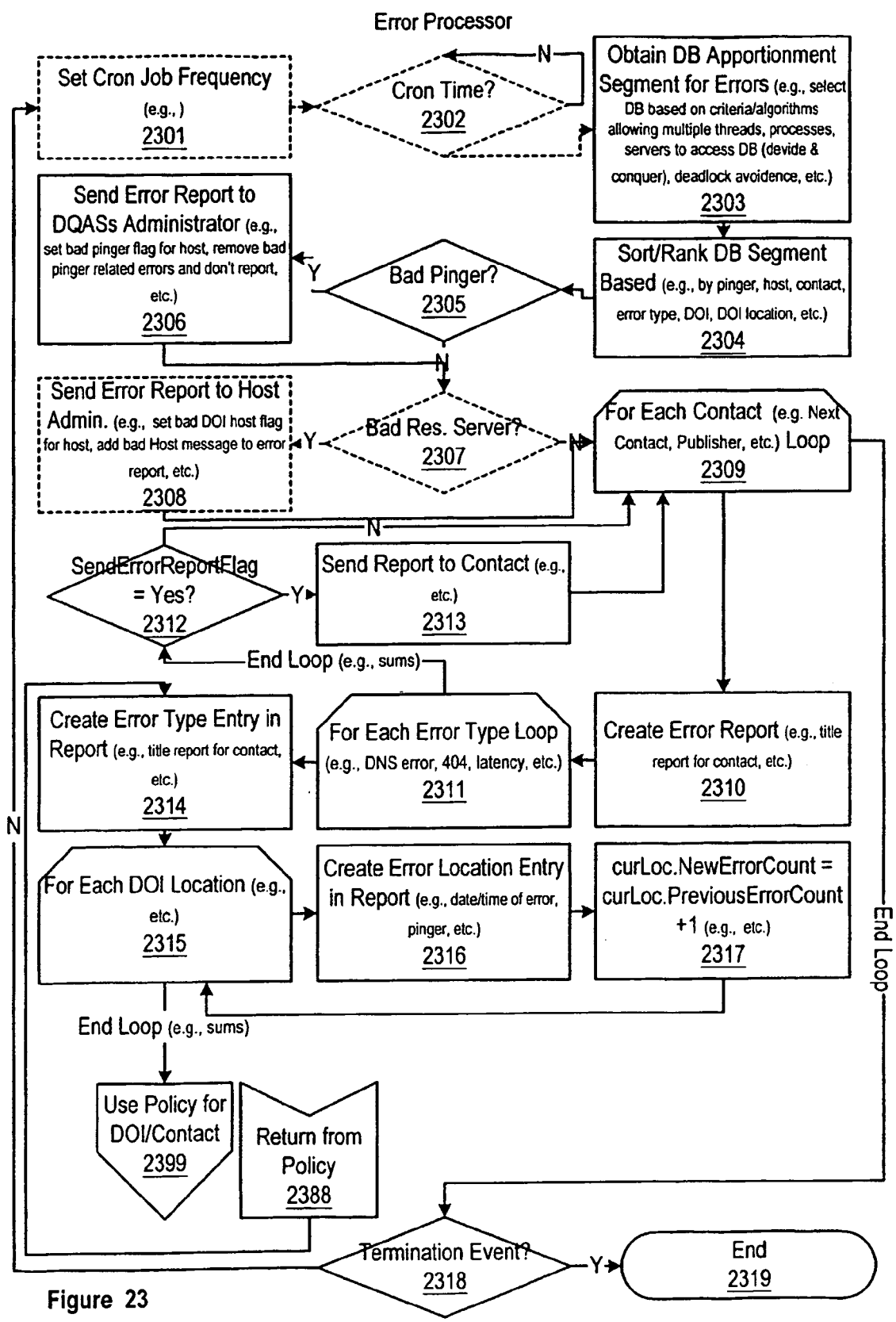
FIG. 23 illustrates one non-limiting example flow diagram of a quality assurance error processor (error processor)

FIG. 23 illustrates one non-limiting example flow diagram of a quality assurance error processor (error processor). Optionally, the error processor may be run at various intervals as set through a cron job at specified periodic intervals 2301. If the error processor runs at specified times, the DQAS will determine if the error processor's time to run has transpired 2302. If not, the DQAS will keep checking until the specified time has arrived 2302. Alternatively, the error processor may run continuously or for only single iterations. Also, the error processor may be executed on demand, e.g., from a user and/or system request.

Upon being instantiated into existence, the error processor obtains an apportionment segment for DOIs from a DQAS database 2303. In other words, the error processor obtains some portion of DOIs requiring validation from an error table in a DQAS database 119. The portion may be established by policies by the DQAS, and/or the error processor. The error processor creates a query request for the DQAS database. As there may be multiple instances of error processors making requests of the DQAS, a central DQAS may manage error processor so as to avoid repeated requests of the same DOIs, deadlocks, and/or the like. In such an embodiment, multiple threads, processes, and servers may all be accessing the DQAS database simultaneously to divide up a potentially large number of ping responses that require parsing by the error processor. In an alternative embodiment, a single DQAS manages all validation of DOIs. In an alternative embodiment, a single DQAS manages all validation of DOIs. In one embodiment, the error processor requests the DOI identifier, associated resolution location, information tag identifier, and/or the like. In another embodiment, ping statistics are also requested. The query request may also supply an initial sort for the database query results based on initial criteria 2304. In one embodiment, the previous computed validation rank is used to sort the query results so that the highest ranked results are validated first. Another embodiment includes a sort order by pinger, then by host, then by contact, then by error type, then by DOI, and then by DOI location 2304.

Upon obtaining the sorted query results from the DQAS database 2304, the error processor determines if bad pinger is a common error 2305. This may be determined by a sort order wherein results from the error table 119 have repeated entries for the same pinger, while the same resolutions generate no errors or different errors when queried from other pingers. Numerous repeated entries for a single pinger may indicate a pinger error, and warrant sending an error report to the DQAS' administrator 2306. In one embodiment, when pinger errors are determined 2305, all returned pinger errors 2304 are flagged with a bad pinger error and such errors are not included in error reports for users so as to allow DQAS administrators to fix any pinger errors without unduly disturbing DOI owners with false alarms.

Upon sending an error report to an administrator 2306 or if no bad pingers are detected 2305, optionally the error processor determines if a bad DOI resolution location server is a common error 2307. This may be determined by a sort order wherein results from the error table 119 have repeated entries for the same server hosting information to which DOIs resolve. Numerous repeated entries for a single host may indicate a host error, rather than an error in the DOI records, and warrant sending an error report to the host's administrator 2308. In one embodiment, when a host error is determined 2307, all returned host errors 2304 are flagged with a bad host error and such errors are not included in error reports for users so as to allow host administrators to fix any host errors.

Upon sending an error report to an administrator 2306, 2308 or if no bad pingers or hosts are detected 2305, 2307, the error processor iterates for each contact in the returned query results for the database segment 2309. In alternative embodiments, rather than iterating by contact, the error processor may iterate by publisher and/or other identifying fields. Contact information may be obtained through contact metadata in a metadata table in a DQAS database 119 and/or from a policy manager 1731 of FIG. 17. Contact information identifies a person and/or entity to contact with regard to any given DOI and/or publisher. For each contact in the returned results 2309, the error processor may create an error report 2309. In one embodiment, initially creating the report may involve simply allocating space in memory for an XML file with the title of the error report, contact metadata information, and/or the like.

Upon initially instantiating an error report for a contact 2310, the error processor iterates for each error type for each contact 2311. Thus for each such error type 2311, the error processor will create an error type entry 2314 in each error report 2310 for each contact 2309. Upon creating an error type entry in the report 2314, the error processor iterates for each location that a DOI references 2315. Thus for each location that a DOI references 2315, the error processor will create an error location entry 2316 in each error type entry 2314 in each error report 2310 for each contact 2309. In one embodiment, the error location entry may include the date and time of the error, the pinger responsible for determining the error, and/or the like. Upon creating an error location entry 2316 in the contact's error report, the error processor calculates the number of errors experienced by the currently iterated location that a DOI references 2317 by adding "1" to the previous error count for the location that a DOI references.

Upon calculating the number of errors experienced by the currently iterated location 2317, the error processor will iterate the next location that a DOI references for the current DOI 2315.

When all the locations have been iterated 2315, the loop ends and the error processor employs a policy for that DOI 2399. The policy may establish how error correction, notification, reporting escalation, and/or the like are to take place for each DOI 2315. Upon executing the policy for all the locations of a DOI 2315, 2399 (continuing in greater detail in FIG. 24), flow returns from the executed policy 2388. Any summation counts are also conducted at the end of the DOI loop 2315. Upon returning from executing any reporting policies 2388, the DOI loop ends and the next error type entry is iterated 2311. When all the error types have been iterated 2311, the loop ends and the error processor determines if a flag to send the generated error report (SendErrorReportFlag) has been set to "Yes" 2312. If so, the finished error report will be sent to the contact 2313. If the flag to send a report has not been set to "Yes," then the next contact is iterated 2309. Any summation counts are also conducted at the end of the error type loop 2311 and are provided into the error report before it is sent. When all the contacts have been iterated 2309, the contact loop ends and the error processor will determine if a termination event has occurred 2318. If not, the miner will wait for the next cron iteration 2301, 2302, and/or continue executing 2303 until a termination event 2318 has been detected at which point execution shall cease 2319.

EXAMPLE DQAS POLICY

Figure 24:
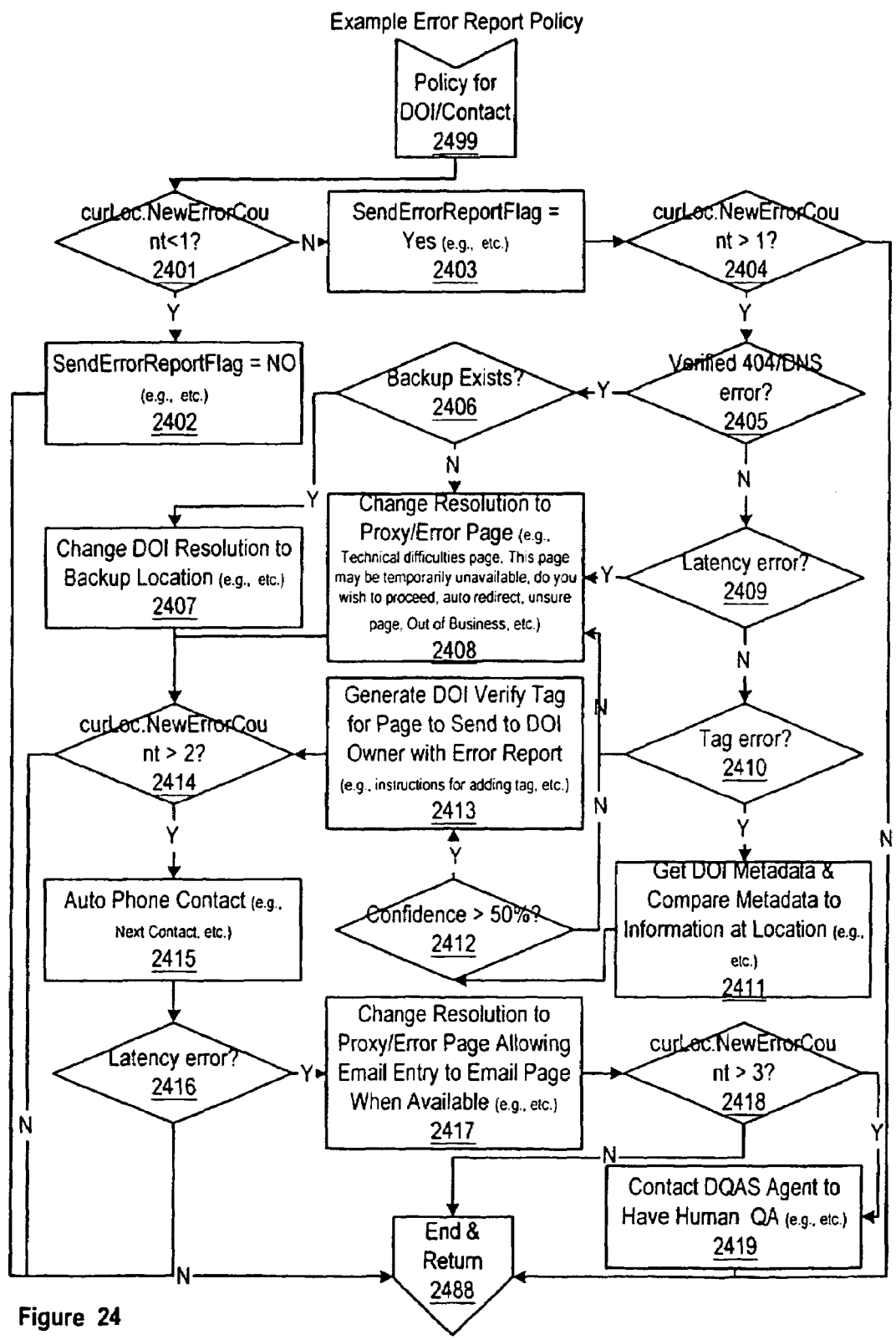
FIG. 24 illustrates one non-limiting example flow diagram of a quality assurance error report policy (policy)

FIG. 24 illustrates one non-limiting example flow diagram of a quality assurance error report policy (policy). Initially, the policy is called 2499 by error processor 1719 of FIG. 17, 2399 of FIG. 23. The policy may be integrated into the error processor, obtained from a policy table in a DQAS database 119. A policy manager 1731 may be used to create various policies. After calling the policy 2499, the error processor determines if the current number of errors calculated by the error processor 2317 of FIG. 23 is less than 1 2401, i.e., if there are no errors. If there are no errors 2401, then SendErrorReportFlag is set to equal "No" 2402 and the policy terminates 2488 with execution flow returning to the point of call 2388 of FIG. 23. If there are errors 2401, then SendErrorReportFlag is set to equal "Yes" 2403.

Next, the error processor determines if the current number of errors calculated by the error processor 2317 of FIG. 23 is greater than 1 2401, i.e., if there are at least two errors. If there is only one error 2404, i.e., the current number of errors is not greater than one, the policy terminates 2488 with execution flow returning to the point of call 2388 of FIG. 23. If there is more than one error 2404, then error processor determines if the current error type 2311 of FIG. 23 is verified to be an HTTP 404 and/or DNS lookup error 2405. If it is a verified 404 and/or DNS error 2405, then the error processor determines if a backup resolution location exists 2406. In one embodiment, an enhanced DOI may have backup locations storing information represented by its DOI. For example, where an enhanced DOI has two backups (e.g., Backup.1@10.123/abcdef; Backup.2@10.123/abcdef), each format will have a resolution location associated with it (e.g., respectively: for backup 1, www.location.com/backup1; for backup 2, www.location2.com/backup2). If a backup does exist 2406, the error processor effects a change in the resolution of the current DOI location 2315 of FIG. 23 to a backup location. For example, wherein a primary DOI's (10.123/abcdef) normal location for information (www.location.com/ data) is reported as unavailable for a second time by the error processor, the policy 2407 effects a new association; namely, the primary DOI's backup location is temporarily set to resolve for the primary DOI (e.g., 10.123/abcdef is set to resolve to www.location.com/backup1). This temporary change of resolution is achieved by effecting a reference update in the Handle System by the registration agency.

However, if no backup enhanced DOI exists 2406, or there is a latency error 2409, or there is no tag error 2410, then the DOI's resolution is changed to a proxy error page 2408 as provided by the DQAS. The error page 2408 may be a web page maintained at the DQAS and/or registration agency. The error page may provide a notice: that the requested DOI is experiencing technical difficulties, that the DOI may be temporarily unavailable, of a link to the location the user wishes to access informing the user of potential problems, of a web page automatically attempting to redirect to the proper location, of web page mentioning that the publisher is no longer available and the last known contact information for the DOI, and/or the like 2413. If the current error is not an unidentified tag error 2410, then all other error types will be handled by the proxy error page as a catchall 2408. However, if the current error is not a tag error 2410, then the error processor may obtain DOI metadata for the current DOI location and compare the metadata to the information at the location referenced by the DOI. A tag error would occur when a user requested that not only should the error processor determine that the current location referenced by the DOI be available, but that it also actually store the proper associated information. In an alternative embodiment, the error processor looks for a tag with the DOI number embedded into the information and/or document for comparison. Upon comparing the metadata and/or tags, the error processor determines a confidence rating of how likely it is that the information at the location referenced by a DOI is the correct information. If the error processor is not more than 50% confident 2412, then the DOI's resolution is changed to a proxy error page 2408. However, if the error processor is more than 50% confident 2412, then the error processor generates a DOI verify tag for the information, which will be sent with any error report and instruction for adding the generated tag 2413. Generating the DOI verify tag for the information may be accomplished by simply informing the user to embed an XML tag with field called DOI and an entry having the content's associated DOI 2413. In an alternative embodiment, the error processor computes a hash, checksum, key, and/or the like based upon the target information's file 2413. In one embodiment, the instruction for adding such a tag are to simply append it to the end of the file 2413. In one embodiment, the instructions are sent as part of the error report 2413.

In yet another alternative embodiment, a tag is generated when registering a DOI via a registration tool. In such an embodiment, upon having securely registered a DOI with the handle system, the DOI is then obtained and embedded as a tag in the actual content. In such an embodiment, the registration tool would append a tag code to a local copy of the source, e.g., creating a file with an XML tag containing the DOI such as "<SOURCE TAG VALIDATOR>10.123/abcdefg</SOURCE TAG VALIDATOR>" and using a Unix cat operation to append the tag to the source. Thereafter, the registration tool would effect and propagate the new modified source to all resolution locations for the DOI, thus providing a tagged version of the source that facilitates validation of source availability. In yet another alternative embodiment, the tagged source may be automatically hosted by a storage facility. Such automatic hosting may be desired if the source has not yet been made available in any location, and/or if a user wishes the source to be made available in new locations.

Upon changing DOI location resolution 2407, changing resolution to a proxy error page 2408, and/or generating DOI verify tags for actual content 2413, the error processor determines if there is more than two errors 2414, i.e., there are 3 or more errors, then notification is escalated to auto dial a contact by phone 2415. The contact may be dialed upon looking up contact information from a metadata data in a DQAS database. Dial out may be achieved by an answering machine enabled telephony modem, and/or the like. If there are not greater than 2 errors 2414, then the policy terminates 2488 with execution flow returning to the point of call 2388 of FIG. 23. Upon calling the phone contact 2415, the error processor checks to see if this is the third latency error 2416. If there are greater than 2 errors 2414 for latency 2416, then the error manager changes the resolution of the DOI to point to a latency proxy error page 2417 similar to the catchall proxy error page 2408. However, this latency proxy error page allows a user to enter an email address into an E-mail field, and the user will be E-mailed his/her requested DOI referenced content 2417.

Upon changing DOI location resolution 2417, the error processor determines if there is more than three errors 2418, i.e., there are 4 or more errors, then notification is escalated to a DQAS agent who in turn can track down a human contact to effect a proper resolution of the DOI 2419. If there are not greater than 3 errors 2418 or the DQAS agent has been contacted 2419, then the policy terminates 2488 with execution flow returning to the point of call 2388 of FIG. 23.

Policy Manager

Figure 25:
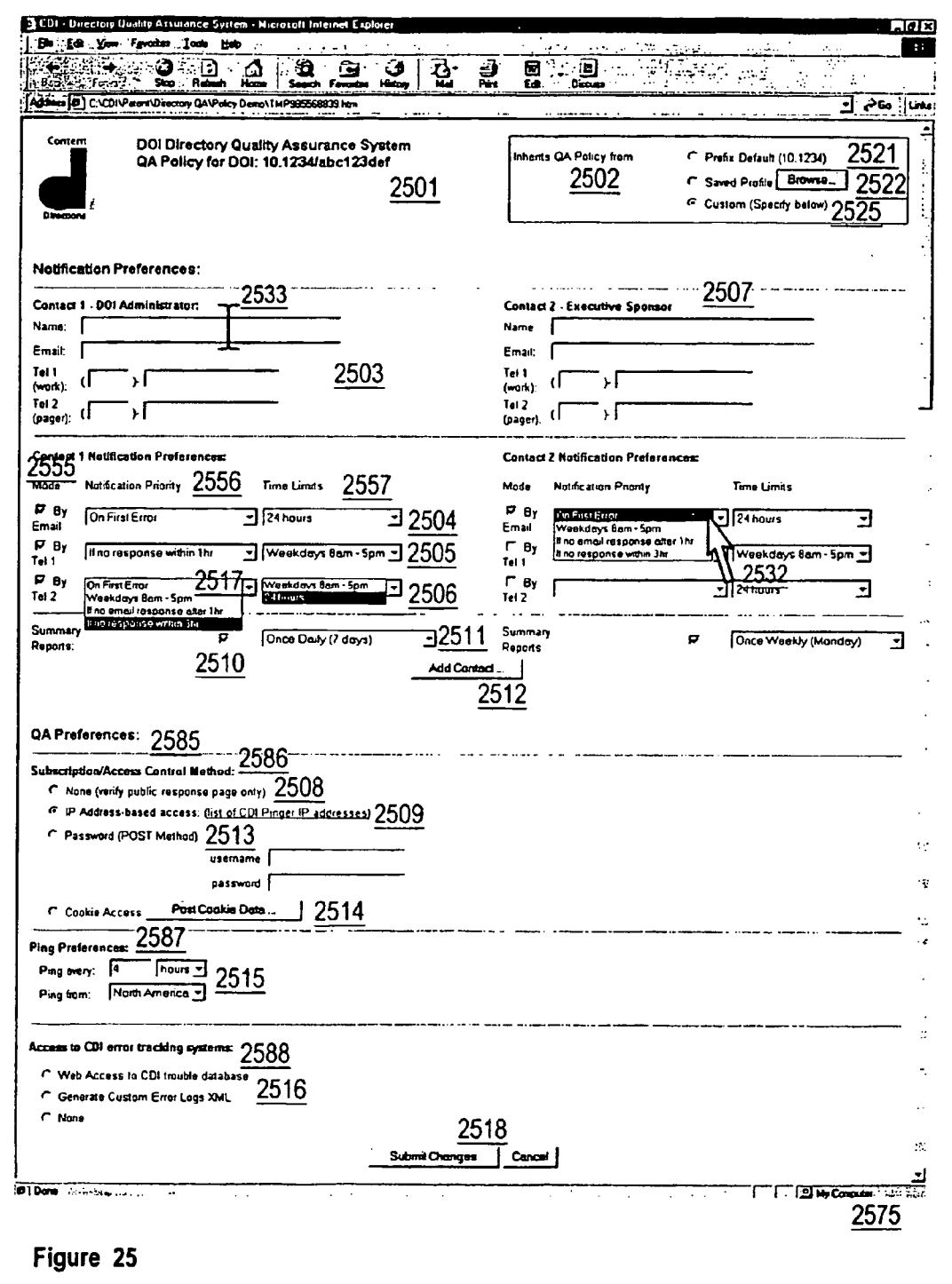

FIG. 25 illustrates a non-limiting example of a policy manager tool. A policy manager tool may be embodied in a web page 2575 to be executed through a web browser. The policy manager tool may employ standard graphical user interface widgets such as text boxes, pop-up menus, and/or the like. The widgets are configured to respond to user controlled cursor selections 2532, and/or text insertion tools 2533. It is understood that various user interface widgets may be used to substitute for the functionality of any example employed widgets herein. For example, the pop-up text entry menu 2504 may be replaced with a plain text field, and/or the like, herein and throughout the disclosure.

In one example embodiment, a user will query a database 119 to obtain a policy for a desired DOI 2501. In one embodiment, the policy may be inherited 2502 by using a policy generic to a publisher prefix 2521, a template policy saved in a profile 2522, or a custom policy 2525 that is specified in the policy manager 2575.

When specifying a custom policy 2525, a user may specify multiple contacts who will be in receipt of notifications from the DQAS 2503, 2507. In the depicted embodiment, two contacts are provided, but alternative embodiments are envisioned with fewer or more contacts. The contacts may be specified by name, E-mail, telephone numbers, and/or the like. In alternative embodiments, addresses, faxes, pagers, and/or the like may be added to the contact information 2503, 2507 for notification purposes.

For each contact, a user may specify a mode by selecting a check box 2555, a notification priority 2556 by selecting choices from a pop-up menu, and a time limit also by way of pop-up menu 2557, all of which establish a policy of notification for that contact. Selecting a mode check box determines if the contact will be notified by a certain mode such as by E-mail 2504, by telephone at work 2505, by pager 2506, and/or the like. Selecting a notification priority option 2556 allows a user to specify if they wish to be notified in instances such as: on the first error reported, anytime an error occurs weekdays from 8 AM to 5 PM, if there is no E-mail response received by the DQAS within one hour of the initial E-mail notification, if there is no E-mail response received by the DQAS within three hours of the initial E-mail notification, and/or the like 2517. Also, time constraints 2557 on the notification 2556, 2555 may be established by the user. Notifications may be issued 24 hours a day, or weekdays from 8 AM to 5 PM. Of course in alternative embodiments, these constraints may be varied allowing specification of individual seconds, minutes, hours, days, weeks, months, years, and/or the like time limits. Similarly, notification priorities may be varied as well as modes.

It is important to note, that in addition to a tiering of notification modes (i.e., E-mail, facsimile, pager, telephone, voice message, human agent contact, etc.), which may be specified in any escalation order, DQAS agents may be notified to intercede and manage error reports on behalf of DOI owners. In such an embodiment, DQAS agents (e.g., system operators, administrators, and/or the like) receive reports and would troubleshoot the cause of error. In one embodiment, such agents would have access to the DOI owner's DOI referenced content, and may proceed to attempt to remedy problems regarding accessibility independently of and/or under the supervision of the DOI owner. Upon administering the problem, DQAS agents would provide a DOI owner with a status reporting service activity. Such delegated administration may be billed for on contract terms, and/or per incident. Such delegation would also save DOI owners from a deluge of error reports. Of course, DOI owners also may request cessation of error reports for any specified period.

Such a delegated administration system may be enabled by an information-sharing system such as Lotus Notes and/or other commercially-available and/or custom-developed software with status notification being routed thereto. Each status notification may be given a job ticket number for billing and administrative purposes. In one such embodiment, the job ticket number may itself be a DOI. In an alternative embodiment, the status notification may also include contact information, which may be obtained from a metadata database, and/or the like.

The user may also specify that summary reports 2510 be generated within certain time limits 2557, 2511. Summary reports may be made once daily (seven days a week) 2511, once weekly on specified days, and almost any other conceived interval. Upon entry of the contact and policy information for a specified contact and DOI, a user may effect the storage of the policy into a DQAS database 119 by engaging a facility to add the contact information (e.g., an add contact button 2512), which may result in the policy manager tool transmitting the policy to the DQAS database for storage.

In one embodiment, the policy manager 2575 provides the ability to set quality assurance preferences 2585 such as subscription controls 2586, ping preferences 2587, access to error tracking 2588, and/or the like. Adding subscription access and method controls 2586 allows the user to specify if the DOI referenced location being tested is: information available to the public without security authorization 2508; to be limited to testing from a specified pinger with a specific IP address to ping the host of the DOI referenced information 2509; requiring a username and password that will be used to issue a POST command to allow a pinger access to information requiring security authorization 2513; requiring some other file based security authorization through cookie access whereby a user can specify a cookie containing security authorization such as username, password, digital certificate, encryption keys, and/or the like 2514; and/or the like. The "Post Cookie Data." facility once engaged brings up a file selection facility allowing the user to identify the requisite security authorization information.

It should be noted that a DOI owner may wish to validate access to a DOI source with and/or without security authorization. For example, a DOI owner may operate a pay-for-content operation and may wish to ping test the content to make sure a proper inaccessible error is returned; or alternatively, the DOI owner may wish non-paid-for access to resolve to another location, such as a URL requesting payment for access. In an alternative example, the DOI owner may want pay-for-content to be tested and validated as being accessible, and thus the DQAS will have to provide a password and/or other security authorization to properly validate the content. In one embodiment, the DQAS may charge varying amounts for such security authorized validation, e.g., changing more for security authorized validation.

In one embodiment, the policy manager allows the user to set ping preferences 2587 by adjusting the interval of pinging and the geographic location of pingers to be used 2515. Also, the policy manager allows the user to access error tracking 2588 by selecting to manually access various error logs from the DQAS 2516 (e.g., allowing the user to have web access to trouble databases, constructing a policy that generates XML based error logs, and/or the like 2516).

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed is:

1. A method of using a computer to access a source, comprising:
    allocating space in a storage facility for a source;
    making a location of the allocated space addressable and accessible over a communications network;
    storing the source to the allocated space;
    generating a unique, persistent, and universal name identifier associated with the source;
    effecting the registration of the unique, persistent, and universal name identifier with an address associated to a location where the source is stored in a database for resolving unique, persistent, and universal name identifiers and locations of associated sources, wherein the unique, persistent, and universal name identifier is unique in the database;
    receiving metadata for the universal name identifier, wherein the metadata provides descriptive data regarding the unique, persistent, and universal name identifier;
    associating the unique, persistent, and universal name identifier with the metadata so that the unique, persistent, and universal name identifier and metadata can be identified by each other;
    registering metadata in a metadata database before effecting the registration of the unique, persistent, and universal name identifier in one phase of a multi-phase registration commitment;
    generating an error if the metadata fails to register in the metadata database; registering the unique, persistent, and universal name identifier in the database in another phase of a multi-phase registration commitment; generating an error if the unique, persistent, and universal name identifier fails to register in the database;
    validating that the source at the location is accessible in yet another phase of a multi-phase registration commitment;
    generating an error if the validation fails; and failing to register the unique, persistent, and universal name identifier if any phase of the multi-phase commitment generates an error.

2. The method of claim 1, wherein the multi-phase commit is at least a three-phase commit comprising registering metadata, registering a unique, persistent, and universal name identifier, and validating the source.

3. A system for using a computer to access a source, comprising:
    means to allocate space in a storage facility for a source;
    means to make a location of the allocated space addressable and accessible over a communications network;
    means to store the source to the allocated space; means to generate a unique, persistent, and universal name identifier associated with the source;
    means to effect the registration of the unique, persistent, and universal name identifier with an address associated to a location where the source is stored in a database for resolving unique, persistent, and universal name identifiers and locations of associated sources, wherein the unique, persistent, and universal name identifier is unique in the database;
    means to receive metadata for the universal name identifier, wherein the metadata provides descriptive data regarding the unique, persistent, and universal name identifier;
    means to associate the unique, persistent, and universal name identifier with the metadata so that the unique, persistent, and universal name identifier and metadata can be identified by each other;
    means to register metadata in a metadata database before effecting the registration of the unique, persistent, and universal name identifier in one phase of a multi-phase registration commitment;
    means to generate an error if the metadata fails to register in the metadata database; r means to register the unique, persistent, and universal name identifier in the database in another phase of a multi-phase registration commitment;
    means to generate an error if the unique, persistent, and universal name identifier fails to register in the database;
    means to validate that the source at the location is accessible in yet another phase of a multi-phase registration commitment;
    means to generate an error if the validation fails; and
    means to fail to register the unique, persistent, and universal name identifier if any phase of the multi-phase commitment generates an error.

4. The system of claim 3, wherein the multi-phase commit is at least a three-phase commit comprising registering metadata, registering a unique, persistent, and universal name identifier, and validating the source.

5. A program stored on a medium readable by a processor, the program to access a source, comprising:
- a module to allocate space in a storage facility for a source; a module to make a location of the allocated space addressable and accessible over a communications network;
- a module to store the source to the allocated space; a module to generate a unique, persistent, and universal name identifier associated with the source;
- a module to effect the registration of the unique, persistent, and universal name identifier with an address associated to a location where the source is stored in a database for resolving unique, persistent, and universal name identifiers and locations of associated sources, wherein the unique, persistent, and universal name identifier is unique in the database;
- a module to receive metadata for the universal name identifier, wherein the metadata provides descriptive data regarding the unique, persistent, and universal name identifier;
- a module to associate the unique, persistent, and universal name identifier with the metadata so that the unique, persistent, and universal name identifier and metadata can be identified by each other;
- a module to register metadata in a metadata database before effecting the registration of the unique, persistent, and universal name identifier in one phase of a multi-phase registration commitment;
- a module to generate an error if the metadata fails to register in the metadata database;
- a module to register the unique, persistent, and universal name identifier in the database in another phase of a multi-phase registration commitment;
- a module to generate an error if the unique, persistent, and universal name identifier fails to register in the database;
- a module to validate that the source at the location is accessible in yet another phase of a multi-phase registration commitment;
- a module to generate an error if the validation fails; and
- a module to fail to register the unique, persistent, and universal name identifier if any phase of the multi-phase commitment generates an error.

6. The medium of claim 5, wherein the multi-phase commit is at least a three-phase commit comprising registering metadata, registering a unique, persistent, and universal name identifier, and validating the source.

7. An apparatus to access a source, comprising:
- a processor; a memory, communicatively connected to the processor;
- a program, stored in the memory, including,
  - a module to allocate space in a storage facility for a source; a module to make a location of the allocated space addressable and accessible over a communications network;
  - a module to store the source to the allocated space; a module to generate a unique, persistent, and universal name identifier associated with the source;
  - a module to effect the registration of the unique, persistent, and universal name identifier with an address associated to a location where the source is stored in a database for resolving unique, persistent, and universal name identifiers and locations of associated sources, wherein the unique, persistent, and universal name identifier is unique in the database;
  - a module to receive metadata for the universal name identifier, wherein the metadata provides descriptive data regarding the unique, persistent, and universal name identifier;
  - a module to associate the unique, persistent, and universal name identifier with the metadata so that the unique, persistent, and universal name identifier and metadata can be identified by each other;
  - a module to register metadata in a metadata database before effecting the registration of the unique, persistent, and universal name identifier in one phase of a multi-phase registration commitment;
  - a module to generate an error if the metadata fails to register in the metadata database;
  - a module to register the unique, persistent, and universal name identifier in the database in another phase of a multi-phase registration commitment;
  - a module to generate an error if the unique, persistent, and universal name identifier fails to register in the database;
  - a module to validate that the source at the location is accessible in yet another phase of a multi-phase registration commitment;
  - a module to generate an error if the validation fails; and
  - a module to fail to register the unique, persistent, and universal name identifier if any phase of the multi-phase commitment generates an error.

8. The apparatus of claim 7, wherein the multi-phase commit is at least a three-phase commit comprising:
registering metadata, registering a unique, persistent, and universal name identifier, and validating the source.

* * * * *